United States Patent
Muto et al.

(10) Patent No.: US 7,983,124 B2
(45) Date of Patent: Jul. 19, 2011

(54) OPTICAL RECORDING/REPRODUCING METHOD, SYSTEM, AND PROGRAM

(75) Inventors: Hideyuki Muto, Tokorozawa (JP); Junichi Furukawa, Tokorozawa (JP); Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 411 days.

(21) Appl. No.: 12/305,833

(22) PCT Filed: Jun. 19, 2007

(86) PCT No.: PCT/JP2007/062271
§ 371 (c)(1),
(2), (4) Date: Dec. 19, 2008

(87) PCT Pub. No.: WO2007/148671
PCT Pub. Date: Dec. 27, 2007

(65) Prior Publication Data
US 2010/0157755 A1   Jun. 24, 2010

(30) Foreign Application Priority Data

Jun. 20, 2006 (JP) .................................. 2006-170663

(51) Int. Cl.
| | |
|---|---|
| G11B 20/00 | (2006.01) |
| G11B 5/00 | (2006.01) |
| G11B 5/52 | (2006.01) |
| G11B 5/55 | (2006.01) |
| G11B 7/125 | (2006.01) |
| G11B 7/00 | (2006.01) |

(52) U.S. Cl. .................. 369/47.15; 369/47.5; 369/53.3; 369/53.26; 369/116

(58) Field of Classification Search ............... 369/47.19, 369/47.5, 47.51
See application file for complete search history.

(56) References Cited

U.S. PATENT DOCUMENTS

| | | | | |
|---|---|---|---|---|
| 2005/0286392 | A1* | 12/2005 | Kamei | 369/121 |
| 2006/0114777 | A1* | 6/2006 | Watanabe et al. | 369/47.1 |

FOREIGN PATENT DOCUMENTS

| | | |
|---|---|---|
| JP | 4-006635 | 1/1992 |
| JP | 5-120717 | 5/1993 |
| JP | 5-197994 | 8/1993 |
| JP | 6-052569 | 2/1994 |
| JP | 7-014165 | 1/1995 |
| JP | 7-073497 | 3/1995 |

(Continued)

OTHER PUBLICATIONS

International Search Report for PCT/JP2007/062271 mailed Sep. 4, 2007.

*Primary Examiner* — Joseph Haley
*Assistant Examiner* — Nicholas Lee
(74) *Attorney, Agent, or Firm* — Nixon & Vanderhye PC

(57) ABSTRACT

A data recording/reproducing system (1) reads a recording signal written on a recording track of a recording medium (3), by using light, which is modulated by a drive signal wherein a frequency signal is superposed for scanning the signal along the recording track at a prescribed scanning speed. Then, the system reproduces the read signal as data. The data recording/reproducing system is provided with a computer (13) for controlling the superposition frequency of the frequency signal for the drive signal corresponding to the scanning speed, and an LD driver (17).

13 Claims, 16 Drawing Sheets

FOREIGN PATENT DOCUMENTS

| | | |
|---|---|---|
| JP | 8-017065 | 1/1996 |
| JP | 2000-163782 | 6/2000 |
| JP | 2001-256652 | 9/2001 |
| JP | 2002-230814 | 8/2002 |
| JP | 2002-352461 | 12/2002 |
| JP | 2002-358651 | 12/2002 |
| JP | 2002-358681 | 12/2002 |
| JP | 2005-209988 | 8/2005 |

* cited by examiner

[FIG.1]
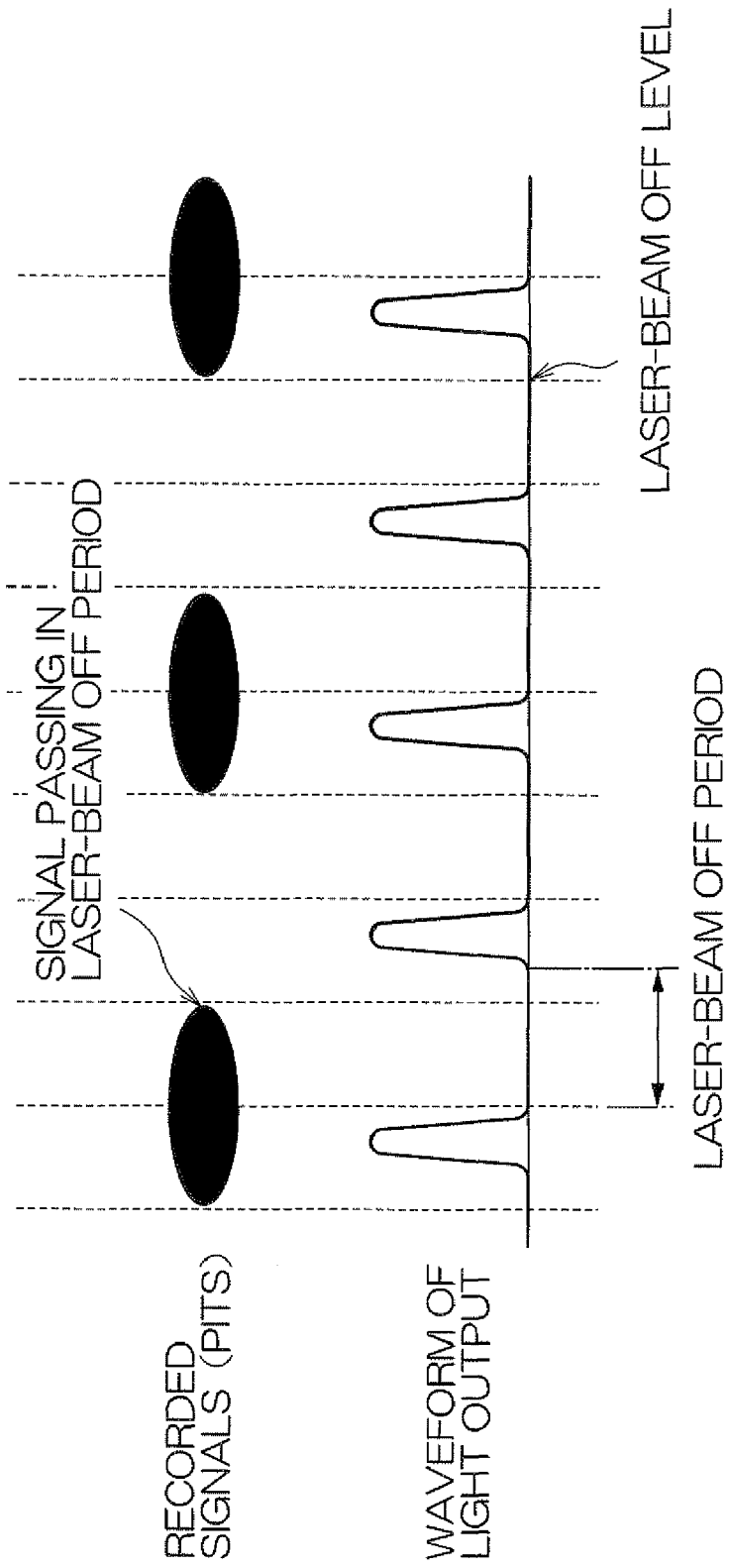

[FIG.2]
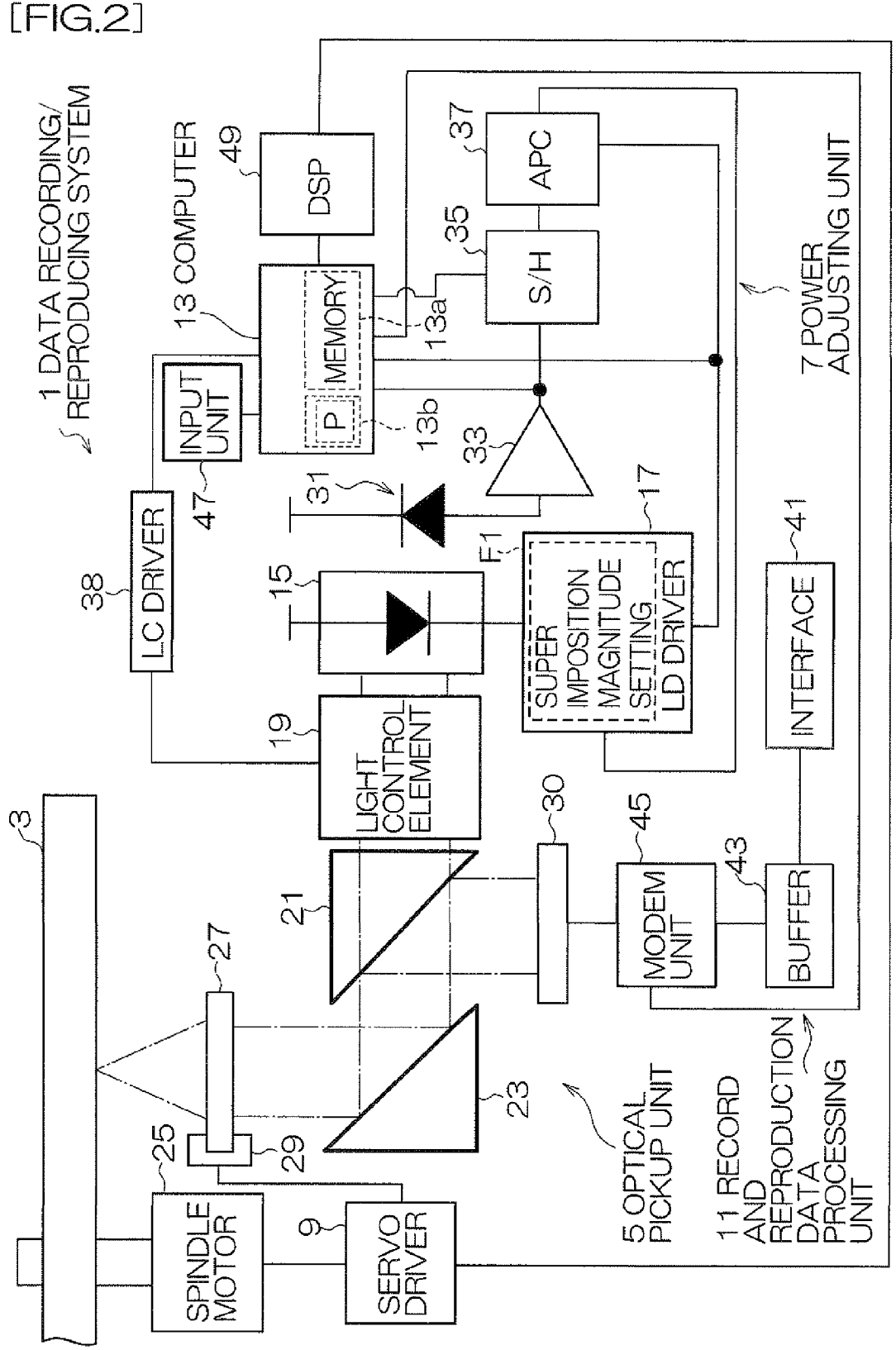

[FIG.3]
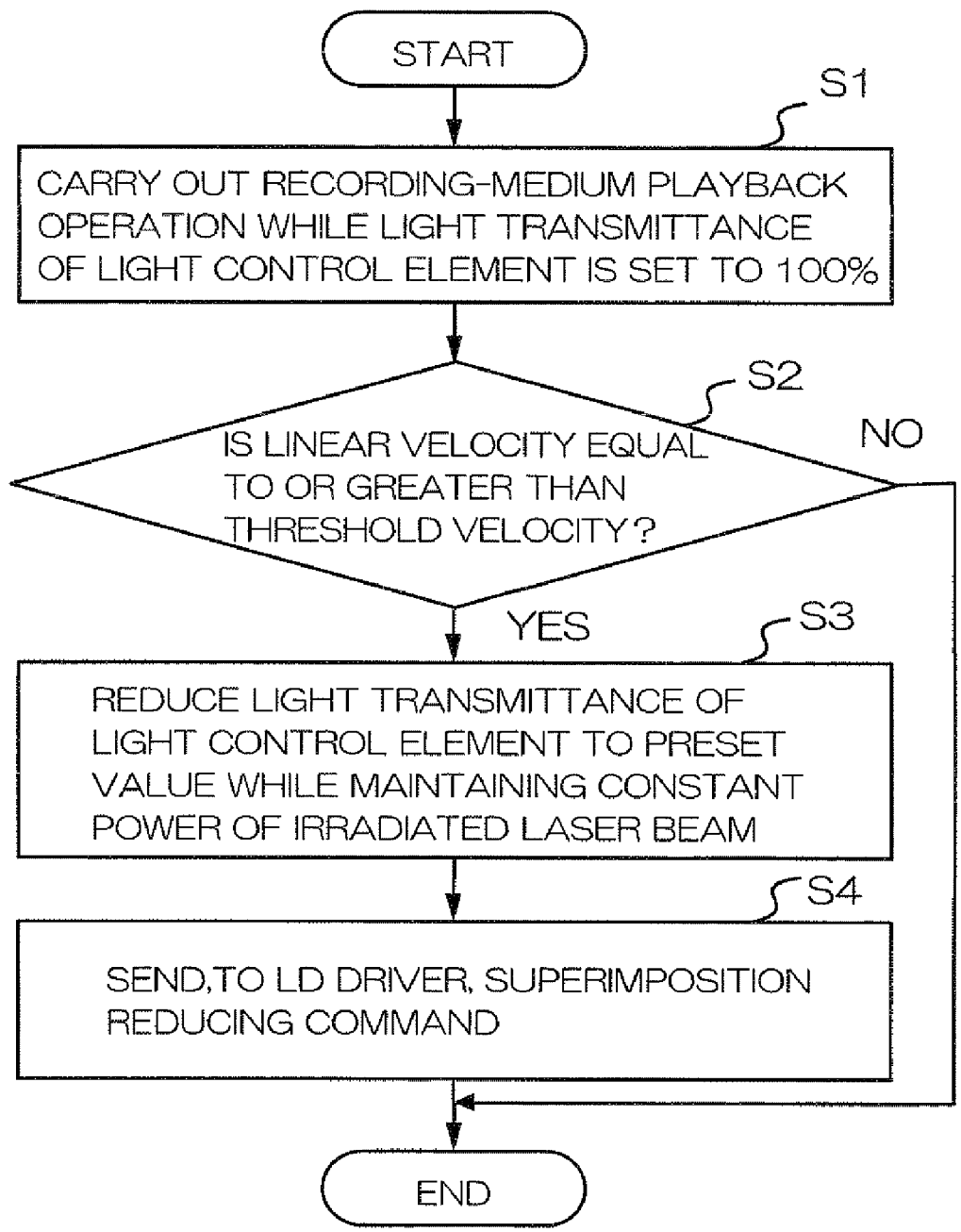

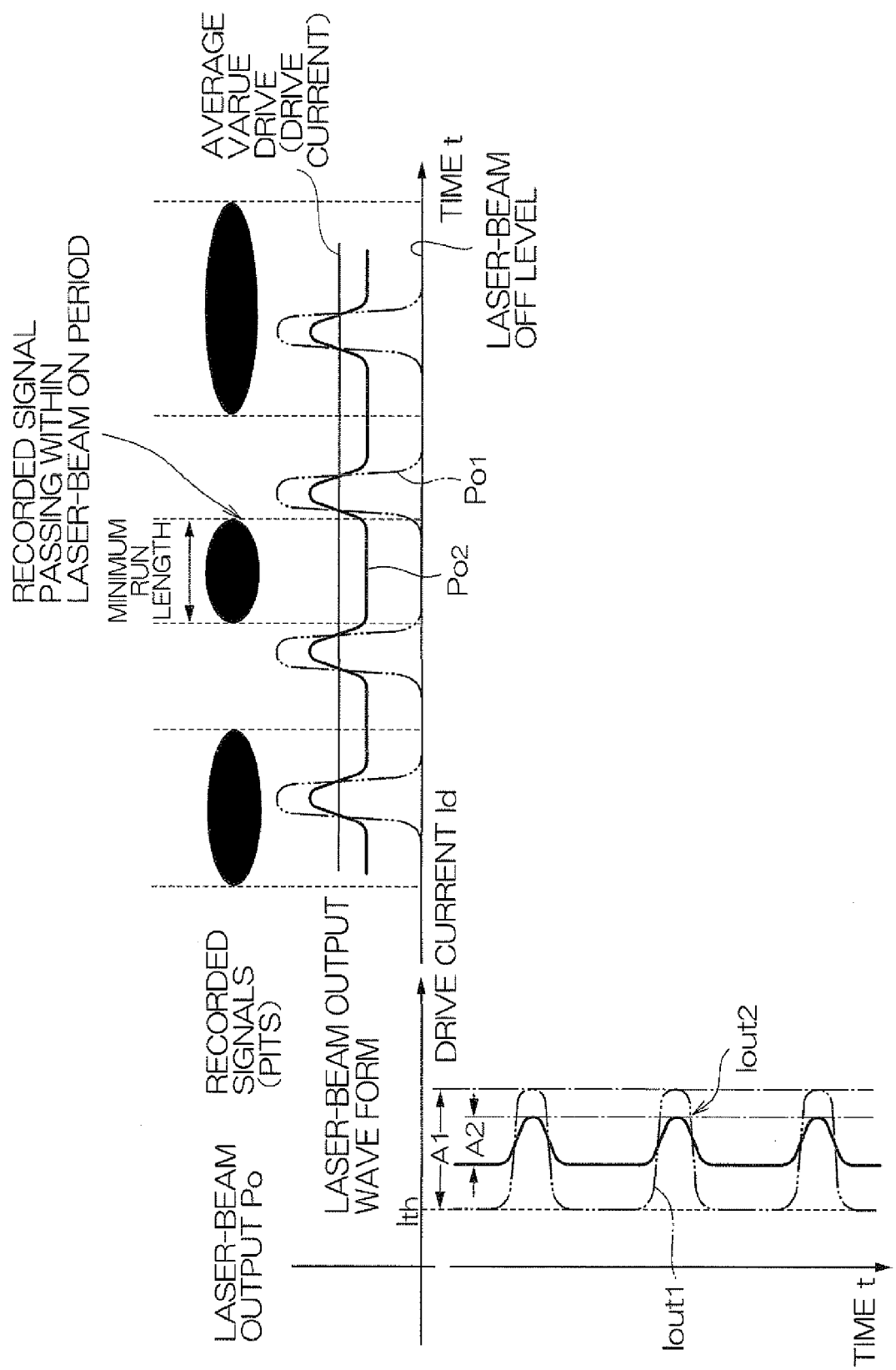
[FIG.4]

[FIG.5]
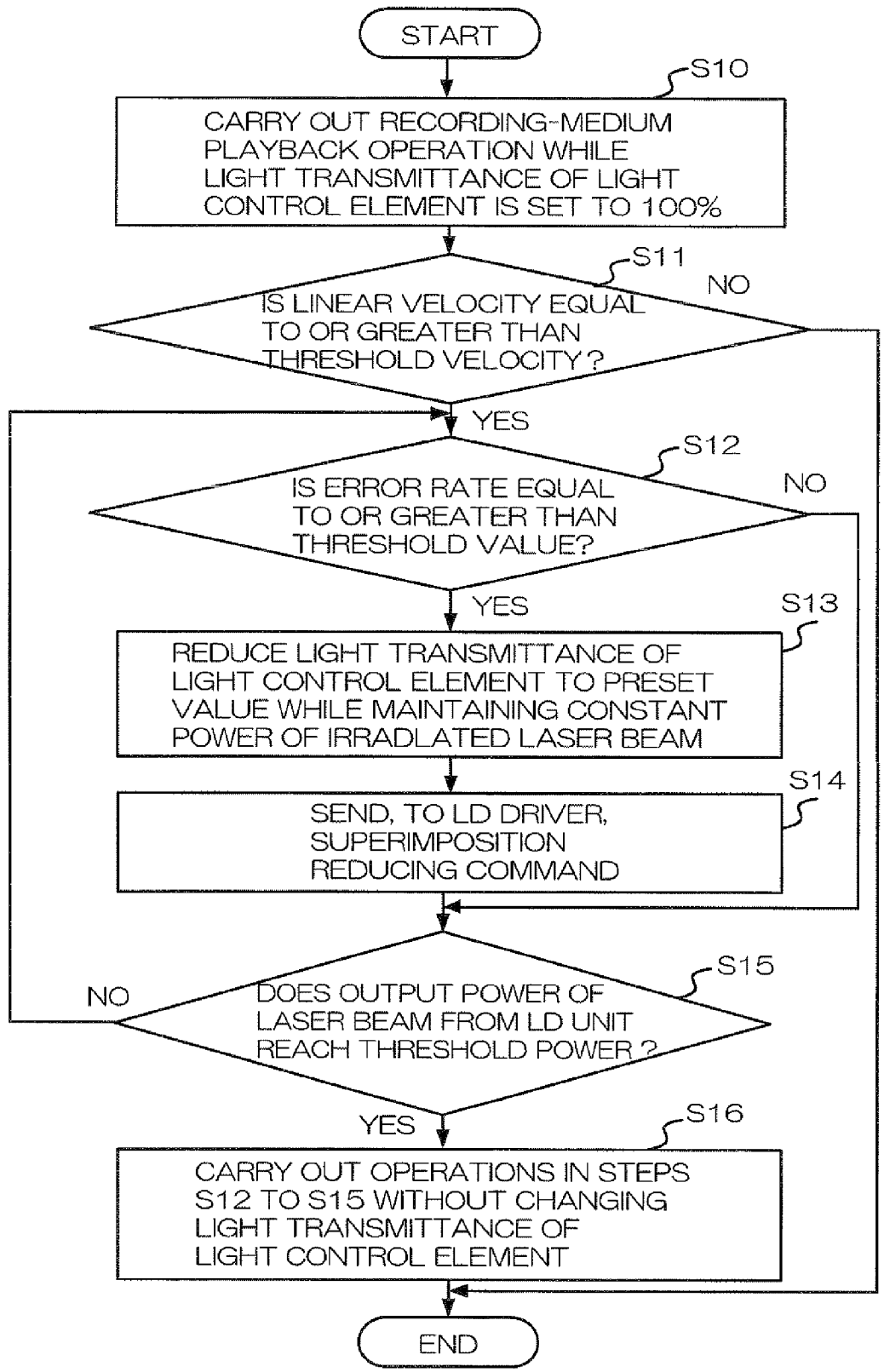

[FIG.6]
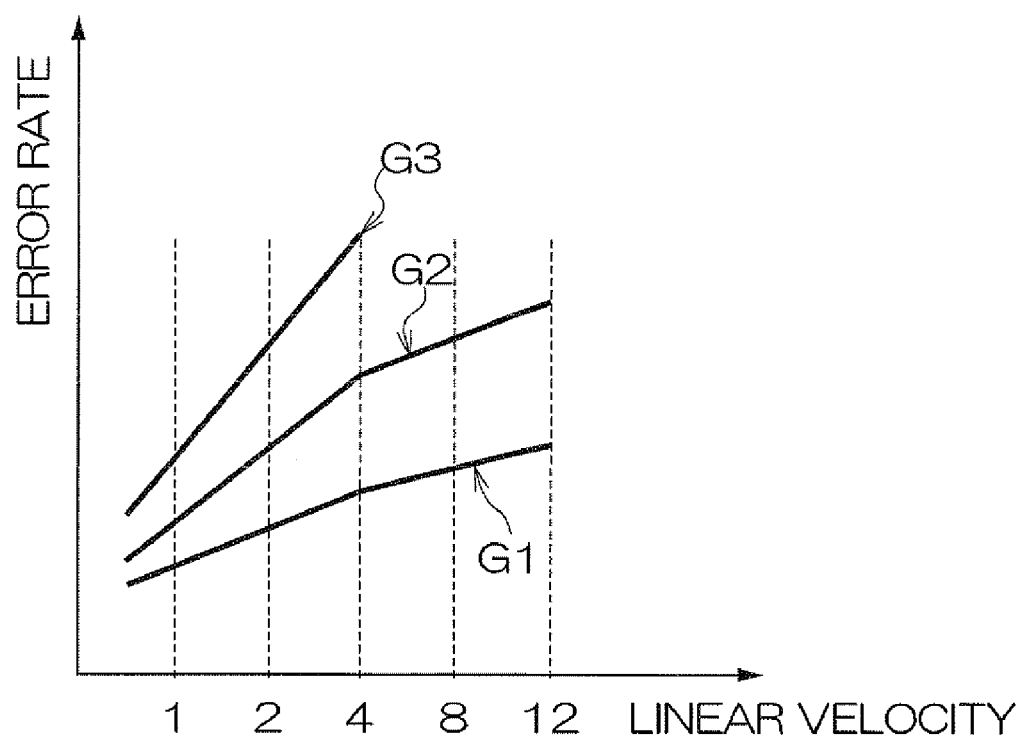

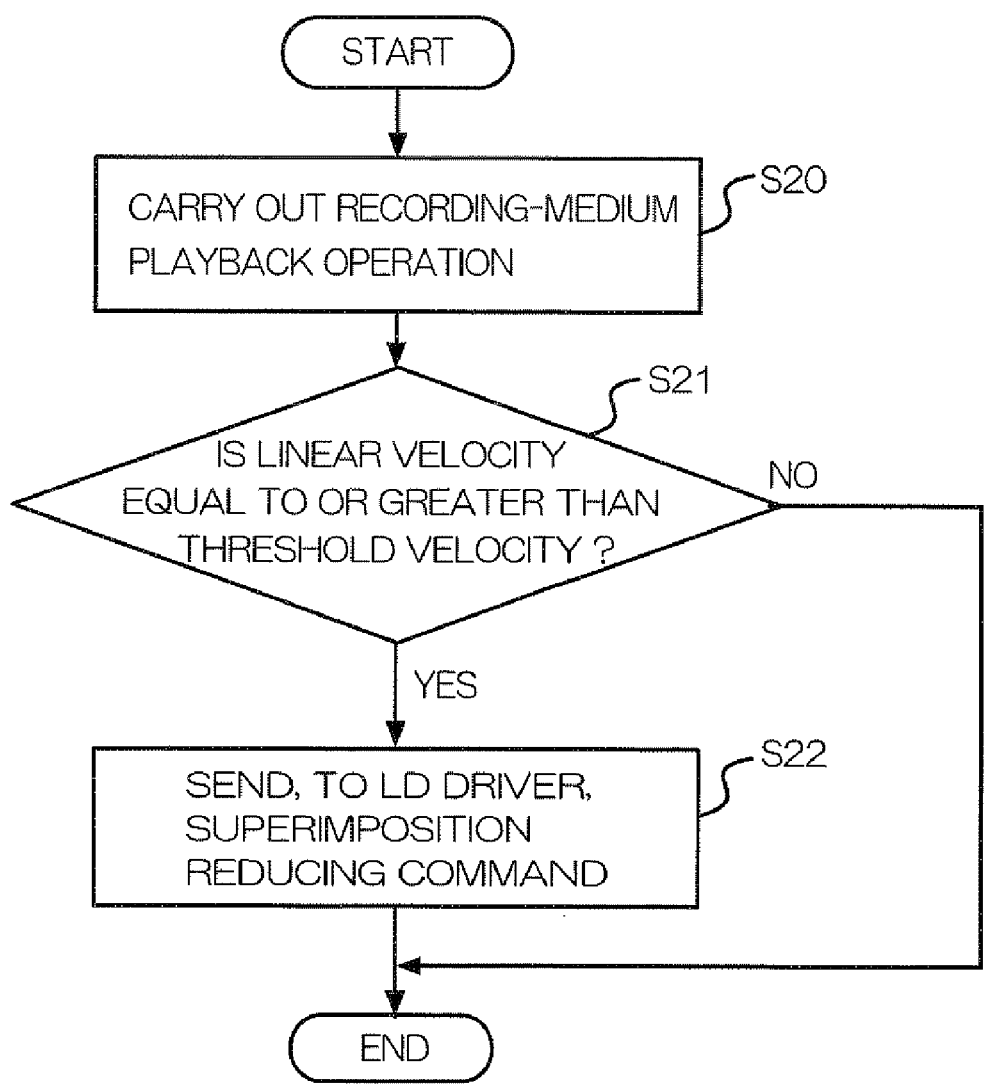

[FIG.8]
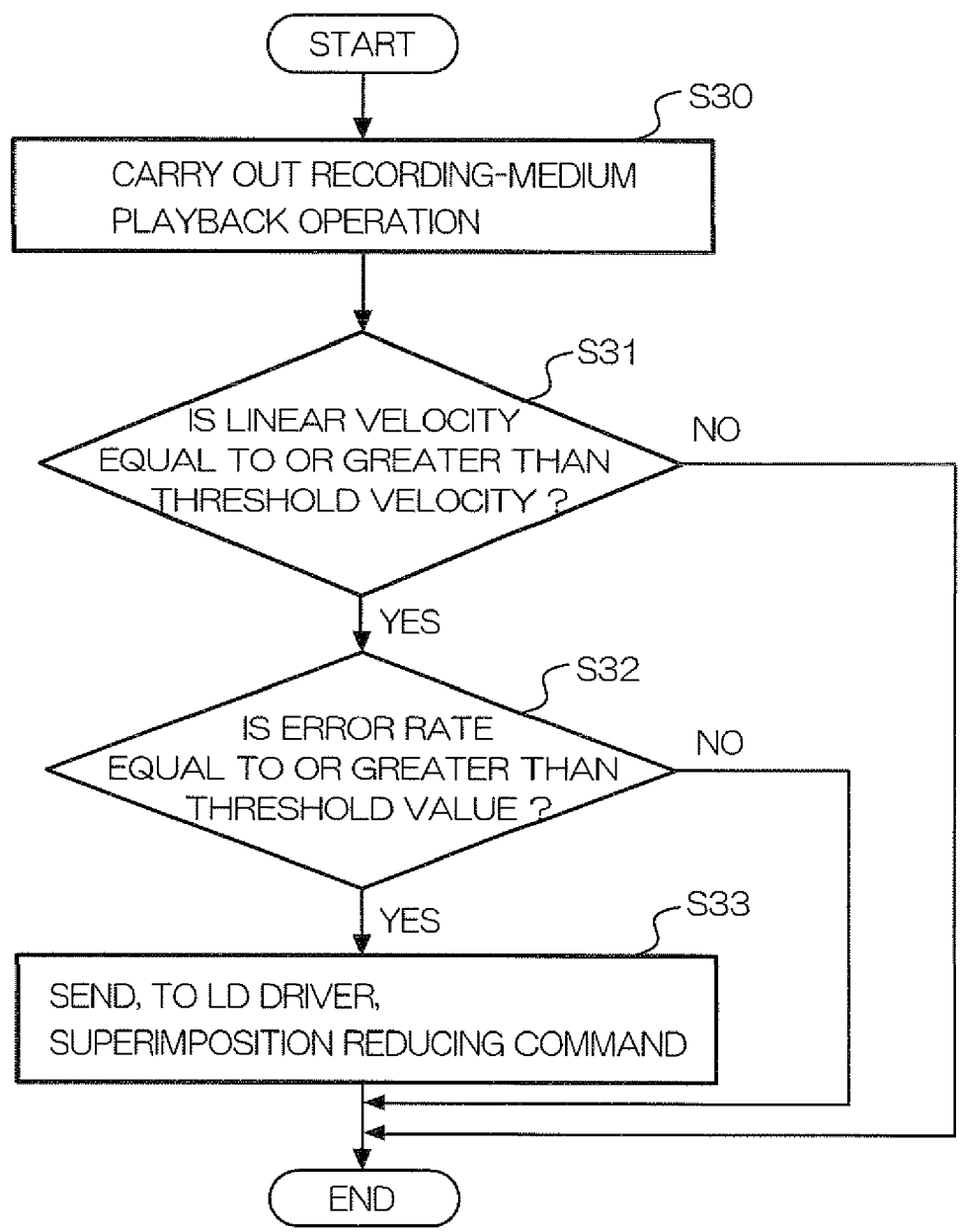

[FIG.9]
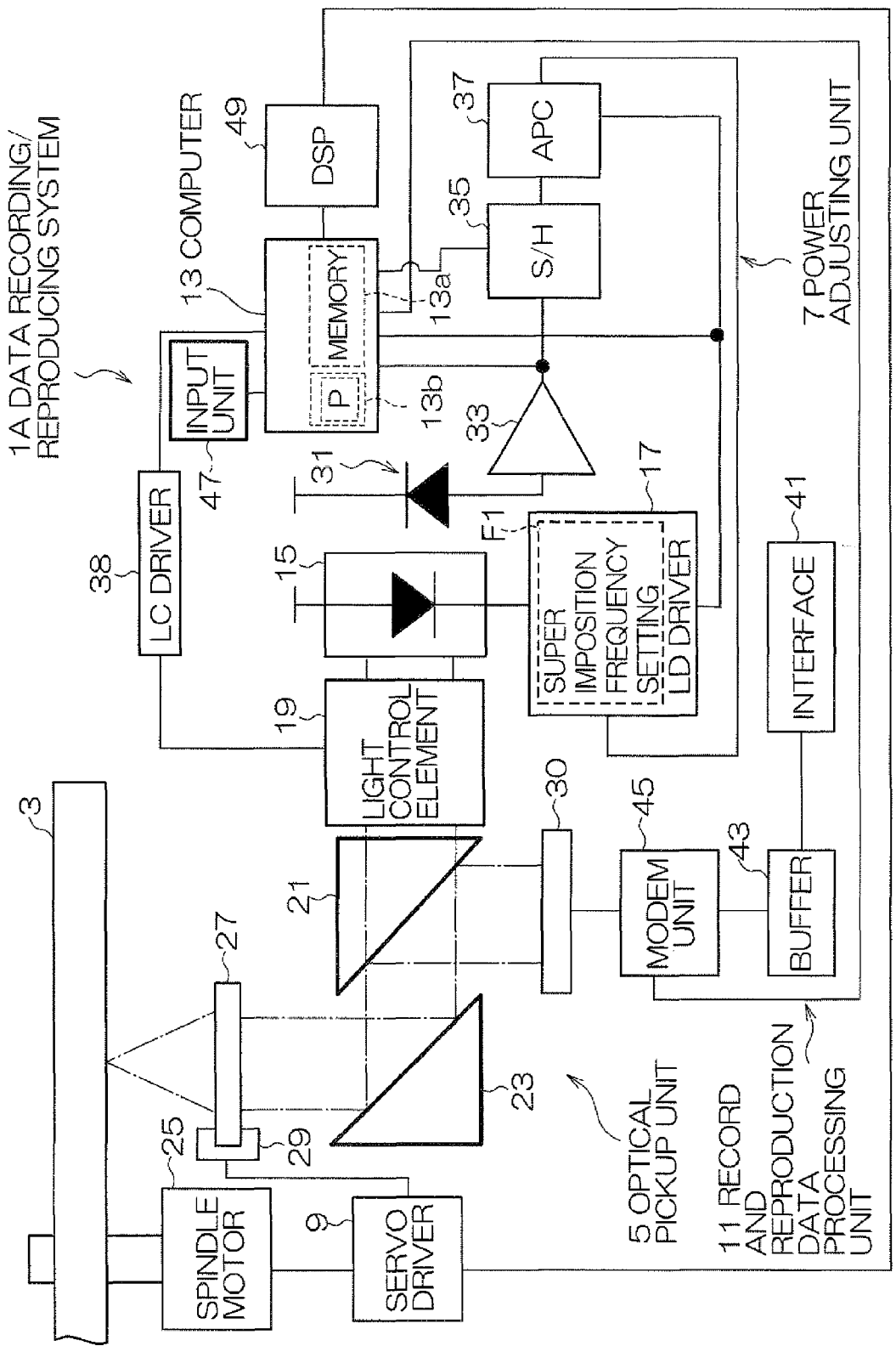

[FIG.10]
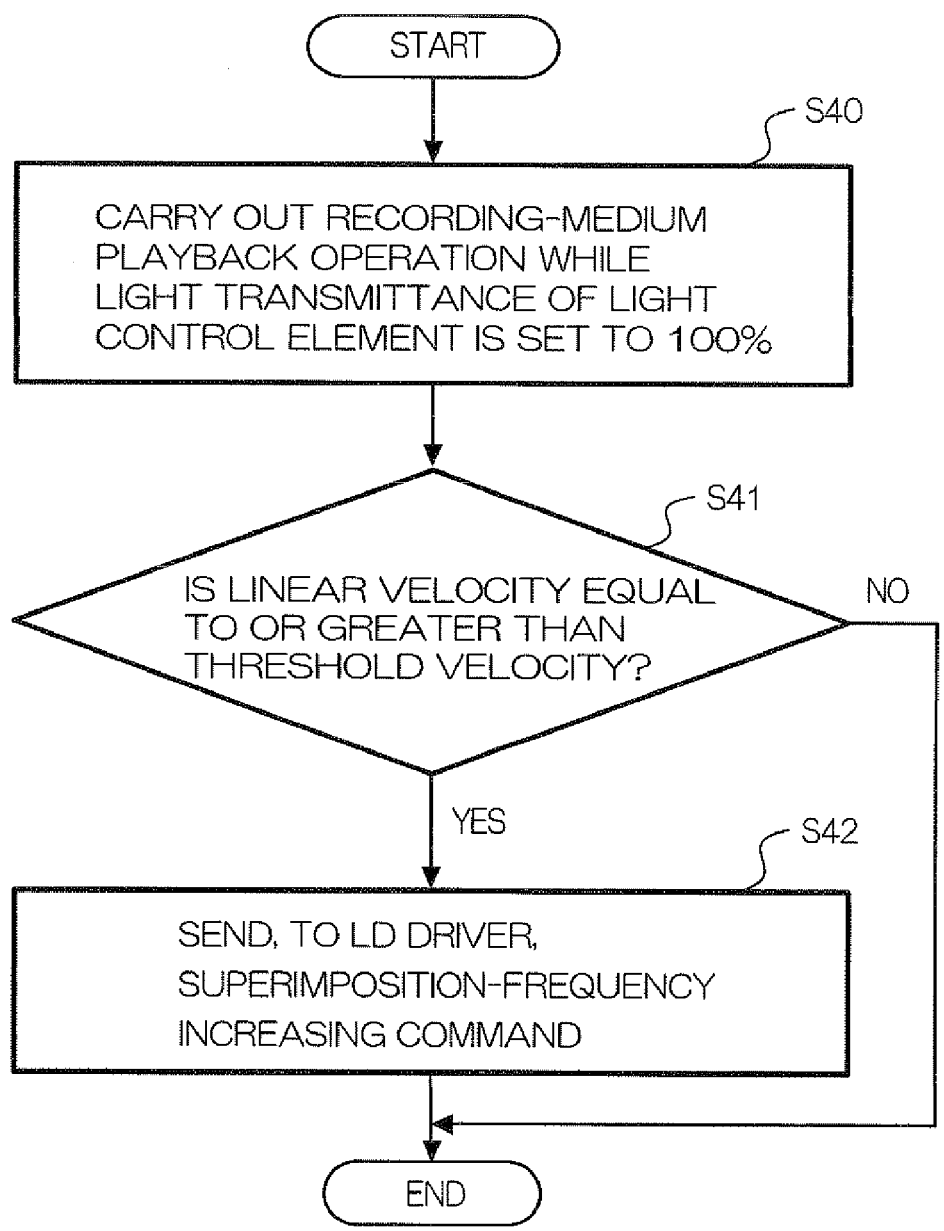

[FIG.11]
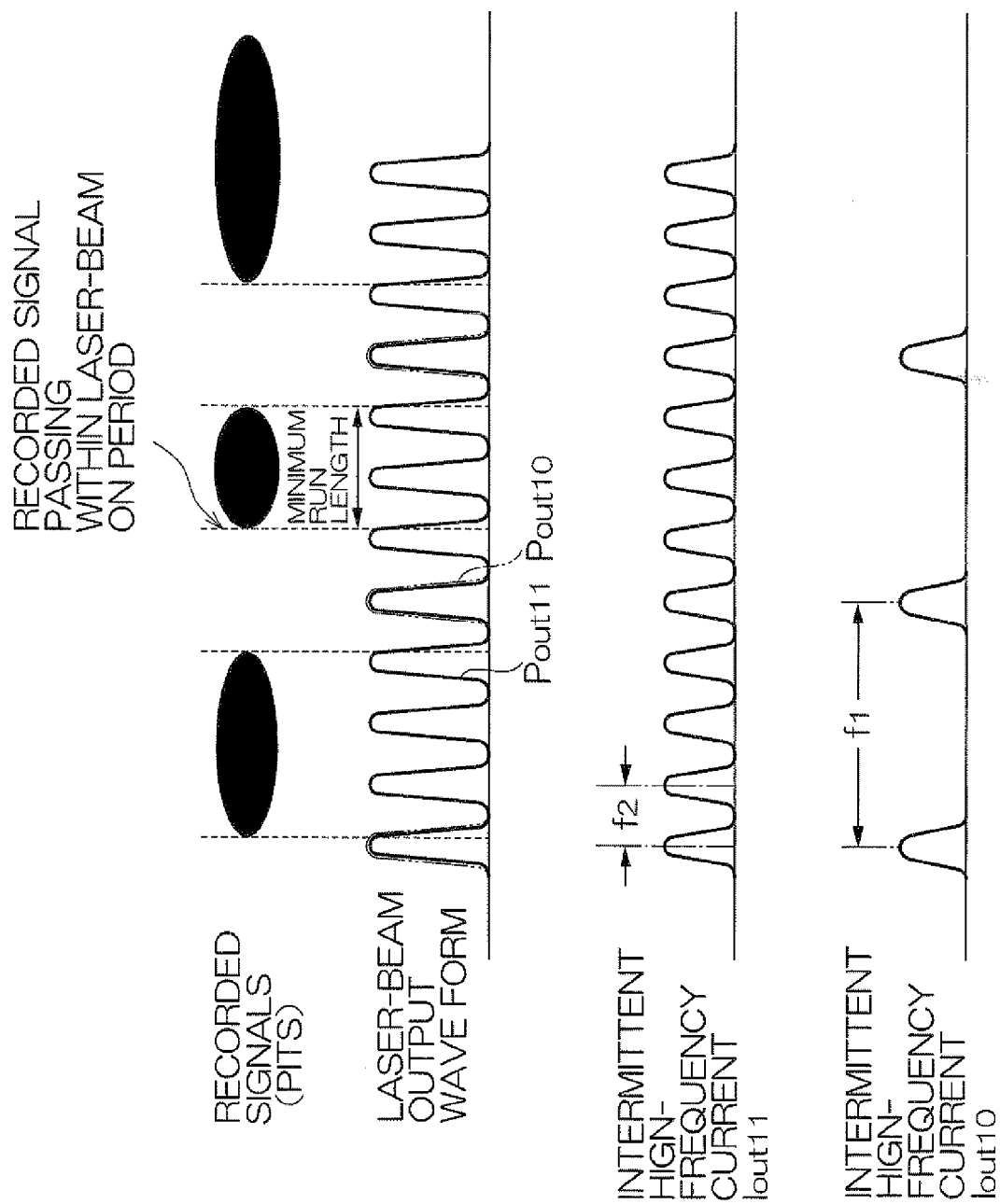

[FIG.12]
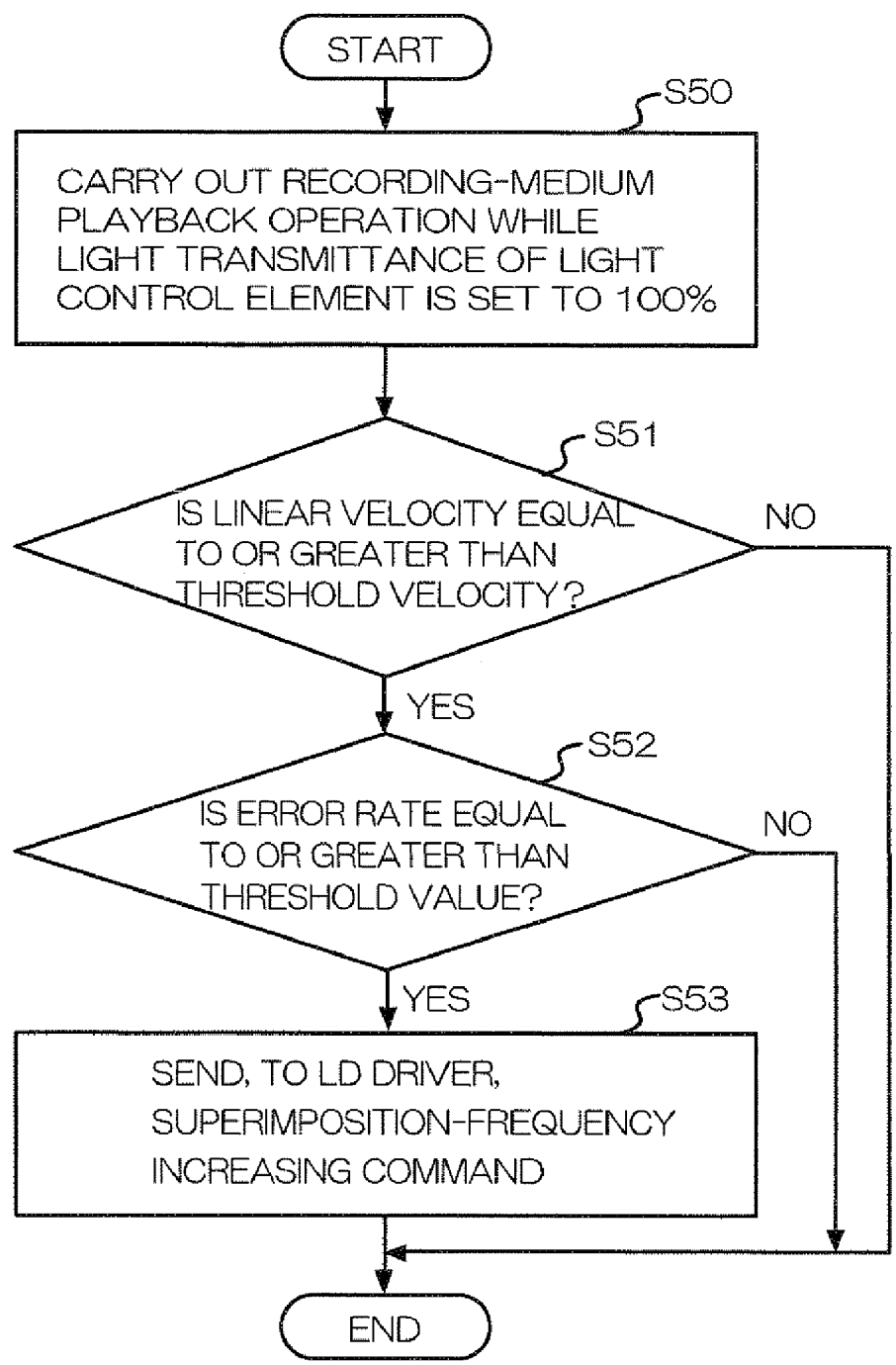

[FIG.13]
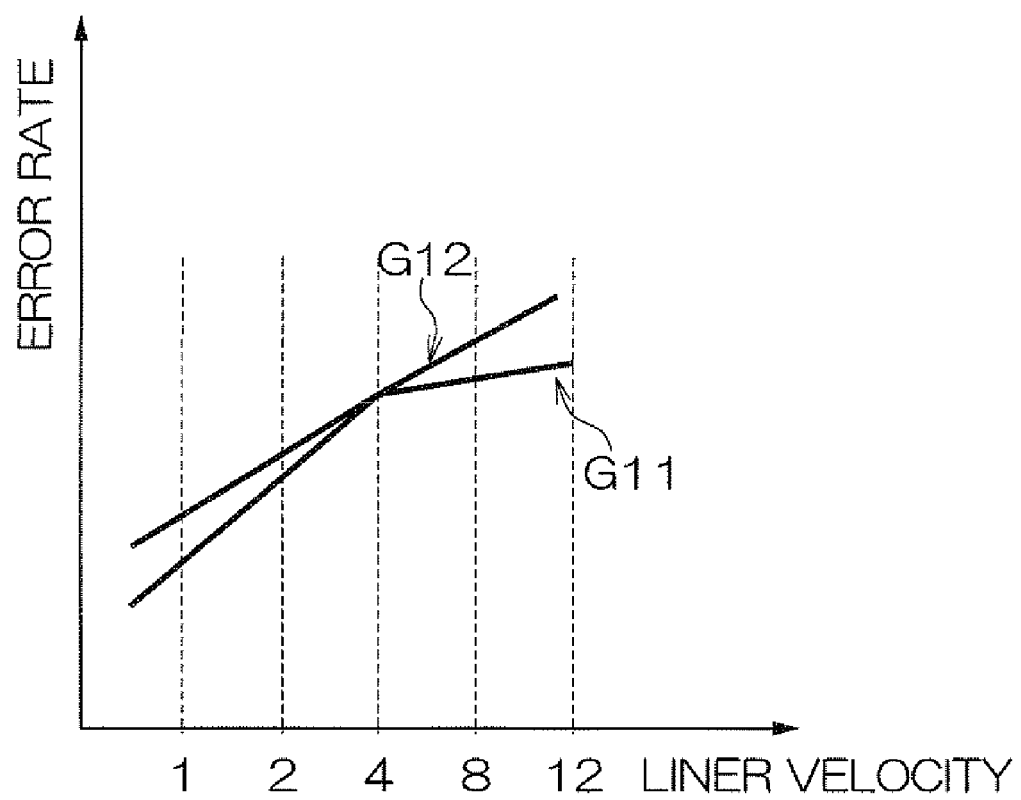

[FIG.14]
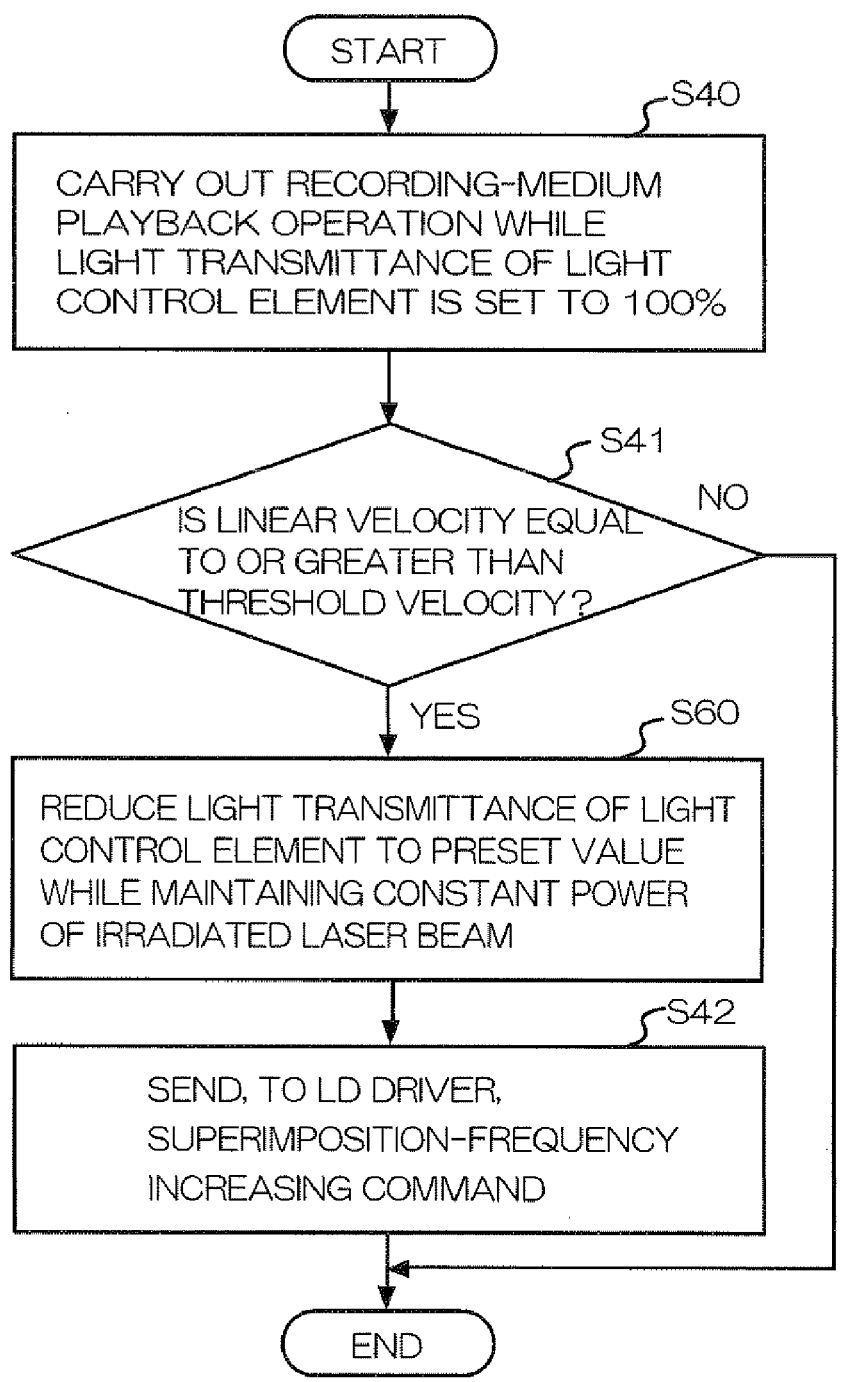

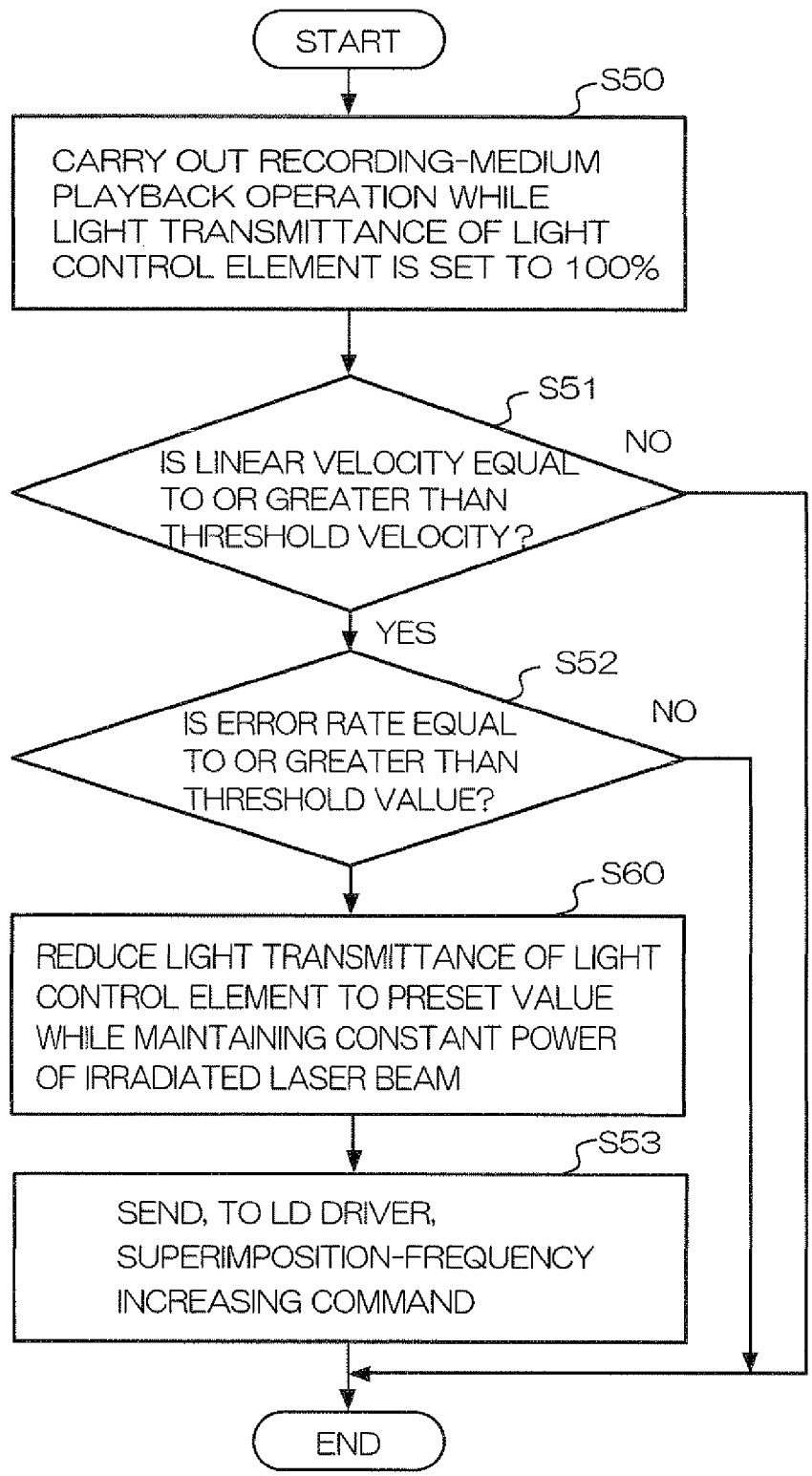
[FIG.15]

[FIG.16]
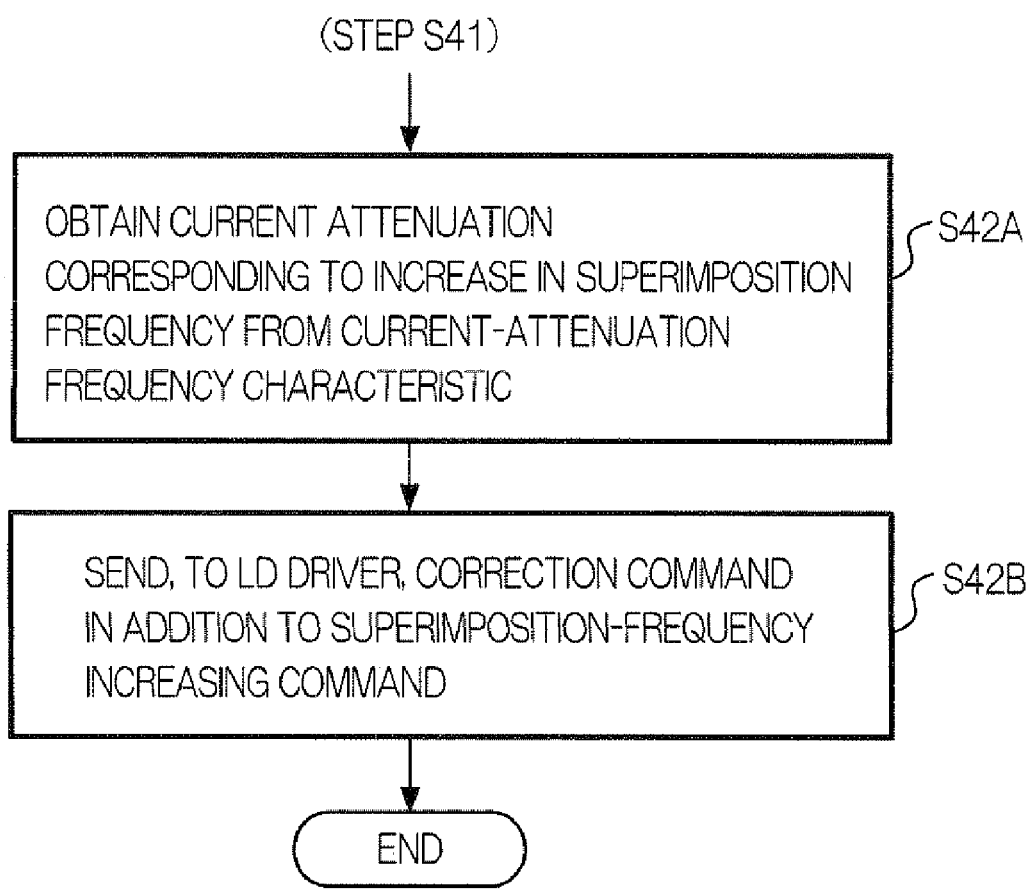

OPTICAL RECORDING/REPRODUCING METHOD, SYSTEM, AND PROGRAM

This application is the U.S. national phase of International Application No. PCT/JP2007/062271 filed 19 Jun. 2007 which designated the U.S. and claims priority to Japanese Patent Application No. 2006-170663 filed 20 Jun. 2006, the entire contents of each of which are hereby incorporated by reference.

TECHNICAL FIELD OF THE INVENTION

The present invention relates to methods, systems, and programs for reproducing data optically recorded on a recording medium, such as a CD (Compact Disc), a DVD (Digital Versatile Disc), a Blu-ray Disc, a HD (High Definition) DVD, or the like.

BACKGROUND ART

Optical recording/reproducing systems are designed to irradiate a laser beam to a recording medium, such as a CD, a DVD, or a next generation DVD (Blu-ray DISC or HD DVD). This writes, into the recording medium, data to be written as a recorded signal by a state change in a recording layer of the recording medium due to the heat of the irradiated laser beam. The optical recording/reproducing systems are also designed to reproduce data corresponding to a beam reflected from a plurality of recorded marks (also referred to as "recorded pits") constituting the recorded signal. Such optical recording/reproducing systems have rapidly become common as data recording/reproducing systems.

In such a data recording/reproducing system, an acceleration of a linear velocity of the laser beam from 1× to 2×, . . . , 32× allows a rate or time of reproduction and/or recording to be reduced. The linear velocity represents a velocity of a laser beam travelling on a medium during recording and/or reproducing.

In such a data recording/reproducing system designed set forth above, a single-mode laser with a comparatively low operating current is used as a light source; this single-mode laser has a single longitudinal mode. A laser light outputted from a single-mode laser has very high coherency. For this reason, for reproducing data, it is required to maintain, at a high level, a ratio of a laser beam to noise, that is, CNR (Carrier to Noise Ratio); this noise may cause power fluctuations in a laser light outputted from the single-mode laser.

The noise that fluctuates the power of a laser beam includes external feedback noise and laser noise. The external feedback noise is due to interference with optical feedback from a recording medium and/or optical components. The laser noise is due to the fluctuations in temperature As described above, data writing (data recording) into a recording medium is carried out by a state change in a recording layer of the recording medium due to the heat of an irradiated laser beam. For this reason, there is a limit to the power of the irradiated laser beam during reproduction from the standpoint of the prevention of deterioration of the recording layer In this respect, Patent Documents 1 and 2 change an optical coupling efficiency, which is a ratio of the quantity of part of a laser beam focused on a recording medium to the total of the laser beam to be irradiated from an optical source, according to its mode (recording mode/reproducing mode), the kind of the recording medium and/or its recording layer (single layer/multiple layer). This can maintain the CNR at a higher level while reducing the power of the irradiated laser beam.

As another method for reducing the external feedback noise, as disclosed in Patent Document 3, a high-frequency current of the order of hundreds of megahertz is superimposed on a drive current (direct current) for a laser beam outputted from a single-mode laser so that the outputted laser beam flashes (on and off). This changes the longitudinal mode of the laser beam to a multimode. This method will be referred to as "high-frequency superimposing method" hereinafter.

Patent Document 1: Japanese Patent Laid-Open No. 2002-260272
Patent Document 2: Japanese Patent Laid-Open No. 2003-196880
Patent Document 3: Japanese Patent Laid-Open No. 2005-346823

DISCLOSURE OF THE INVENTION

Problems to be Solved by the Invention

FIG. 1 illustrates an example of a relationship between recorded signals written to a part of a recording track and the waveform of a laser beam output obtained by the high-frequency superimposing. Note that the run length (mark length) of a recorded signals along a recording track is commonly modulated. However, in FIG. 1, to facilitate the description, the recorded signals each with a minimum run length are written to a part of the recording track. The part of the recording track is linearly developed in the track direction.

In addition, in FIG. 1, an intermittent high-frequency current in the form of a sine wave with its positive duty (on-duty) being less than 50% is used as the high-frequency current.

When a reproducing linear velocity is increased so that the time required for the minimum run length of a recorded signal to pass through a scanning position of the laser beam approaches the period of the intermittent high-frequency current, as illustrated in FIG. 1, the recorded signal may pass through the scanning position of the laser beam in a high-frequency current off period, in other words, a laser-beam off period, making it difficult to read the recorded signal.

The present invention has been made in light of the circumstances provided above, and has an object of reliably reading a signal recorded in a recording medium to reproduce data corresponding to the recorded signal even if a reproducing linear velocity is increased.

Means for Solving the Problems

A first aspect of the present invention is an optical recording/reproducing system for reading a recorded signal written to a recording track of a recording medium by light. The light is modulated by a drive signal on which a frequency signal is superimposed. The light is scanned along the recording track at a predetermined scan velocity. The optical recording/reproducing system includes a superimposition magnitude control unit that controls, based on the scan velocity, a superimposed magnitude of the frequency signal on the drive signal.

A second aspect of the present invention is a program readable by a computer installed in an optical recording/reproducing system. The optical recording/reproducing system reads a recorded signal written to a recording track of a recording medium by light. The light is modulated by a drive signal on which a frequency signal is superimposed. The light is scanned along the recording track at a predetermined scan velocity. The program instructs the computer to execute an operation to control, based on the scan velocity, a superimposed magnitude of the frequency signal on the drive signal.

A third aspect of the present invention is an optical recording/reproducing method for reading a recorded signal written to a recording track of a recording medium by light. The light is modulated by a drive signal on which a frequency signal is superimposed. The light is scanned along the recording track at a predetermined scan velocity. The optical recording/reproducing method includes controlling, based on the scan velocity, a superimposed magnitude of the frequency signal on the drive signal.

BRIEF DESCRIPTION OF THE DRAWINGS

FIG. 1 is a view illustrating an example of a relationship between recorded marks written to a part of a recording track and the waveform of a laser beam output obtained by high-frequency superimposing;

FIG. 2 is a block diagram illustrating a schematic structure of a data recording/reproducing system according to a first embodiment of the present invention;

FIG. 3 is a flowchart schematically illustrating an example of operations to be carried out by a computer of the data recording/reproducing system according to the first embodiment of the present invention;

FIG. 4 is a view illustrating a relationship between two intermittent high-frequency currents to be superimposed on a drive current from an APC circuit illustrated in FIG. 2 and laser-beam outputs from an LD unit illustrated in FIG. 2; these laser-beam outputs correspond to the respective intermittent high-frequency currents;

FIG. 5 is a flowchart schematically illustrating an example of operations to be carried out by a computer of a data recording/reproducing system according to a second embodiment of the present invention;

FIG. 6 is a graph representing one example relationship between reproducing linear-velocity variation and error-rate variation obtained by reproducing data recorded on a Blu-ray Disc used as a recording medium illustrated in FIG. 2 with the use of operations in steps S10 to S16 illustrated in FIG. 5;

FIG. 7 is a flowchart schematically illustrating an example of operations to be carried out by a computer of a data recording/reproducing system according to a third embodiment of the present invention;

FIG. 8 is a flowchart schematically illustrating an example of operations to be carried out by a computer of a data recording/reproducing system according to a fourth embodiment of the present invention;

FIG. 9 is a block diagram illustrating a schematic structure of a data recording/reproducing system according to a fifth embodiment of the present invention;

FIG. 10 is a flowchart schematically illustrating an example of operations to be carried out by a computer of the data recording/reproducing system according to the fifth embodiment of the present invention;

FIG. 11 is a view illustrating a relationship between two intermittent high-frequency currents to be superimposed on a drive current from an APC circuit illustrated in FIG. 9 and laser-beam outputs from an LD unit illustrated in FIG. 9; these laser-beam outputs correspond to the respective intermittent high-frequency currents;

FIG. 12 is a flowchart schematically illustrating an example of operations to be carried out by a computer of a data recording/reproducing system according to a sixth embodiment of the present invention;

FIG. 13 is a graph representing one example relationship between reproducing linear-velocity variation and error-rate variation obtained by reproducing data recorded on a Blu-ray Disc used as a recording medium illustrated in FIG. 9 with the use of operations in steps S50 to S53 illustrated in FIG. 12;

FIG. 14 is a flowchart schematically illustrating an example of operations to be carried out by a computer of a data recording/reproducing system according to a seventh embodiment of the present invention;

FIG. 15 is a flowchart schematically illustrating an example of operations to be carried out by a computer of a data recording/reproducing system according to an eighth embodiment of the present invention; and FIG. 16 is a flowchart schematically illustrating an example of operations to be carried out by a computer of a data recording/reproducing system according to a modification of the fifth to eighth embodiments of the present invention.

DESCRIPTION OF CHARACTERS 1, 1A Data recording/reproducing system
3 Recording medium
5 Optical pickup unit
7 Power adjusting unit
9 Servo driver
11 Record and reproduction data processing unit
13 Computer
13a First memory
13b Second memory
15 Laser diode unit
17, 17A Laser diode driver
19 Light control element
21 Beam splitter
23 Stand-up mirror
25 Spindle motor
27 Objective lens
29 Actuator
30 Receiver
31 Monitor photo diode;
33 Amplifier
35 Sample-hold circuit
37 APC circuit
38 LC driver
41 Interface
43 Buffer
45 Modulator and demodulator
49 Digital signal processor

BEST MODES FOR CARRYING OUT THE INVENTION

Embodiments of the present invention will be described hereinafter with reference to the drawings.

First Embodiment

FIG. 2 is a block diagram illustrating a schematic structure of a data recording/reproducing system 1 according to a first embodiment of the present invention.

In FIG. 2, reference numeral 3 represents a recording medium including, for example, a disc-like protective layer and a disc-like recording layer including spiral or concentric recording tracks. For example, as the recording medium 3, a CD, a DVD, a Blu-ray Disc, a HD DVD, or the like can be used.

The data recording/reproducing system 1 according to the first embodiment has a function of recording information on the recording tracks of the recording medium 3 rotating at a desired velocity and a function of reproducing information recorded on the recording tracks of the recording medium 3.

For example, in the First embodiment, the recording tracks, as one structural example, include at least one of lands and grooves alternately arranged in a radial direction. The at least one of the lands and grooves are wobbled at a predetermined frequency, and part of the at least one of the lands and grooves is for example phase-modulated to include information such as address informant of the recording tracks.

Specifically, the data recording/reproducing system 1 is equipped with an optical pickup unit (optical head unit) 5 for recording/reproducing information on/from the recording tracks of the rotating recording medium 3 by irradiating a light spot on the recoding tracks. The data recording/reproducing system 1 is equipped with a power adjusting unit 7 for adjusting power of the irradiated light on the recording medium 3.

The data recording/reproducing system 1 is also equipped with a servo driver 9 as a servo-control system for carrying out: rotating-velocity controls of the recording medium 3, focus-position controls of the spot beam to be irradiated on the recording tracks of the recording medium 3 by the optical pickup unit 5, and tracking controls of the beam spot with respect to the recording tracks.

Moreover, the data recording/reproducing system 1 is equipped with a record and reproduction data processing unit 11 having a function of producing data (referred to as "record data" hereinafter) corresponding to information to be recorded on the recording medium 3 and a function of producing data (referred to as "reproduction data" hereinafter) corresponding to information recorded on the recording medium 3.

The data recording/reproducing system 1 is equipped with a computer 13 that controls the optical pickup unit 5, the power adjusting unit 7, the servo driver 9, and the record and reproduction data processing unit 11.

The computer 13 includes a first memory 13a, such as a HDD (Hard Disc Drive), a FLASH MEMORY, or the like, for storing therein data representing processed results and the like, and a second memory 13b serving as a main memory of the computer 13 for storing therein a plurality of programs P loaded from the first memory 13a. The plurality of programs P cause the computer 13 to carry out the control operations.

Referring to FIG. 2, the optical pickup unit 5 includes a laser diode (LD) unit 15, an LD driver 17, and a light control element 19. The LD unit 15 irradiates a laser beam as light for information recording and/or information reproducing. The LD driver 17 controls the waveform of the laser beam outputted from the LD unit 15. The light control element 19 serves as an element for adjusting the quantity of the laser beam outputted from the LD unit 15. The light control element 19 is made up of a liquid crystal device with a light transmittance that changes with change in an applied voltage from a LC (Light Control) driver described hereinafter.

For example, in the first embodiment, the LD unit 15 and the light control element 19 of the optical pickup unit 5 are arranged such that the optical axis of the laser beam guided by the components 15 and 19 is parallel to the surface of the protective layer of the recording medium 3.

Note that, in the first embodiment, the light control element 19 has the light transmittance of a substantially 100% (decay rate of 0%) in an initial condition The optical pickup unit 5 also includes a beam splitter 21 disposed on an optical path of the laser beam outputted from the LD unit 15 and transferred through the light control element 19. The beam splitter 21 is operative to transmit therethrough the laser beam travelling through the light control element 19 and to reflect a light beam sent from a stand-up mirror described hereinafter.

The optical pickup unit 5 further includes a stand-up mirror 23 arranged on an optical path of the laser beam passing through the beam splitter 21. The stand-up mirror 23 is configured to reflect the laser beam passing through the beam splitter 21 in a direction perpendicular to the optical axis of the passing laser beam toward the recording medium 3.

The optical pickup unit 5 includes a spindle motor 25. The spindle motor 25 supports the recording medium 3 such that the recording medium 3 faces the stand-up mirror 23 and the optical axis of the laser beam reflected by the stand-up mirror 23 is orthogonal to the surface of the protective layer of the recording medium 3. The spindle motor 25 also rotatably drives the recording medium 3.

The optical pickup unit 5 includes an objective lens 27 interposed between the stand-up mirror 23 and the protective layer of the recording medium 3. The objective lens 27 is operative to focus the laser beam reflected by the stand-up mirror 23 onto a recording track of the recording medium 3 to thereby irradiate the laser beam thereto as a spot beam.

The optical pickup unit 5 includes an actuator 29. The actuator 29 is allowed to move the objective lens 27 in at least a radial direction of the recording medium 3 and a direction close to and away from the recording medium 3. The actuator 29 is electrically connected to the servo driver 9. The actuator 29 is configured to move the objective lens 27 under control of the servo driver 9 to thereby adjust a focusing position and a tracking position of the beam spot.

The objective lens 27 is operative to, during reproduction, receive light reflected from a recording track of the recording medium 3 and to output the received light as a parallel beam with a predetermined beam diameter. The stand-up mirror 23 is operative to reflect the reflected beam transferred through the objective lens 27 so as to transfer the reflected beam to the beam splitter 21.

The beam splitter 21 works to reflect the reflected beam transferred from the stand-up mirror 23.

The optical pickup unit 5 includes a receiver 30. The receiver 30 is arranged on the optical path of the reflected beam reflected by the beam splitter 21. The receiver 30 receives the reflected beam and converts the received beam into an electric signal (referred to as "RF signal" hereinafter).

The power adjusting unit 7 includes a monitor photodiode, referred to as "monitor diode", 31 and an amplifier 33. The monitor diode 31 is arranged on an optical path of a laser beam outputted from a back surface in a package of the LD unit 15; this back surface is opposite to a normal output end of the LD unit 15. The laser beam outputted from the back will be referred to as "backside laser beam". The backside laser beam has the same power as that of the laser beam outputted from the normal output terminal of the LD unit 15.

The monitor diode 31 continuously monitors the power (intensity) of the backside laser beam and outputs the result of the monitoring as a monitor signal (monitor electric signal, such as a monitor current).

The amplifier 33 is electrically connected to the monitor diode 31. The amplifier 33 amplifies the monitor signal outputted from the monitor diode 31.

The amplifier 33 is electrically connected to the computer 13. The computer 13 is allowed to monitor the power of the laser beam irradiated on the recording medium 3 based on the monitor signal amplified by the amplifier 33 and the actually set light transmittance of the light control element 19.

The power adjusting unit 7 includes a sample-hold circuit (S/H) 35 electrically connected to the amplifier 33 and the computer 13. The sample-hold circuit 35 is operative to sample a value of the monitor signal outputted from the amplifier 33 and to hold the sampled value during the execution of APC (Automatic Power Control) by the computer 13.

The power adjusting unit 7 also includes an APC circuit 37 electrically connected to the sample-hold circuit 35 and the LD driver 17. During the execution of the APC by the computer 13, the APC circuit 37 is operative to control a driving current from the LD driver 17 to the LD unit 15 based on the sampled and held value of the monitor signal by the sample-hold circuit 35 such that:

the sampled and held value of the monitor signal is substantially matched with a predetermined value corresponding to a predetermined power level of the laser beam irradiated on the recording medium 3.

This carries out feedback control of the output waveform of the laser beam outputted from the LD unit 15 including the putout power level.

The power adjusting unit 7 includes a light control element driver (LD driver) 38. Under control of the computer 13, the LC driver 38 works to control a voltage to be applied therefrom to the light control element 13 to thereby control the light transmittance of the light control element 19.

The record and reproduction data processing unit 11 includes an interface 41 that receives record data (bit-string data) inputted from a connection device during recording. The record and reproduction data processing unit 11 includes a buffer 43 electrically connected to the interface 41 and operative to hold the record data received by the interface 41. The record and reproduction data processing unit 11 includes a modulator and demodulator 45 electrically connected to the buffer 43. Each of the interface 41, buffer 43, and modulator and demodulator 45 is electrically connected to the computer 13. The operations of each of the interface 41, the buffer 43, and the modulator and demodulator 45 are configured to be controlled by the computer 13.

The modulator and demodulator 45 is operative to, during recording, append an error-correcting code, such as a PI (Parity Inner) correcting code and/or a PO (Parity Outer) correcting code to the record data stored in the buffer 43 for each predetermined unit of the record data. In the first embodiment, the modulator and demodulator 45 is operative to, during recording, append the error-correcting code to the record data for each ECC (Error Correction Code) block of the record data.

Note that the ECC block represents a unit of data to be stored in the recording medium 3.

For example, the recording medium 3 according to the first embodiment is a DVD, the ECC block is configured by 280 rows of 182 bytes each. 280 rows consist of 192 rows and 16 rows of the PO correcting code, and 182 bytes consist of 172 bytes of data and 10 bytes of the PI connecting code. Specifically, 12 rows of 172 bytes constitutes one data frame, and 16 date frames constitute one ECC block.

For example, in the first embodiment, the recode data of each data frame of each ECC block to which the error-correcting code has been appended is converted into a signal according to a clock (wobble clock) with a wobble frequency of the recording tracks such that the signal is changed from a high level to a low level or the low level to the high level at each bit of "1" of the record signal. The wobble clock is extracted from a wobble signal obtained by scanning the wobbled recording tracks by the computer 13.

The converted data, such as NRZI data (Non Return to Zero Inverted) data, corresponds to recorded signals (recorded marks, recorded pits) to be written to the record tracks of the recording medium 3.

Note that, in the first embodiment, a bit length (run length or recorded-signal length) of the NRZI data until its edge changes depending on an encoding or the like. For example, the bit lengths of the NRZI data are set to be NT. The reference character N varies depending on the type of the recording medium 3. For example, when the recording medium 3 is a DVD, the N is set to be equal to or greater than 3, and when the recording medium 3 is a Blu-ray Disc, the N is set to be equal to or greater 2. The reference character T represents the period of the wobble clock.

Specifically, in the first embodiment, on a recording track of the recording medium 3, the laser beam, which has a power level on the recording medium 3 being automatically feedback-controlled to a recording power level and has a modulated output waveform, such as a multipulse-modulated output waveform, is irradiated. This allows recorded signals corresponding to respective run length of the NRZI data to be written onto a recording track of the recording medium 3.

The output-waveform control (multipulse control) of the laser beam is called "Write Strategy", Proper setting of the width of each of independent multi-pulses of the output waveform of the laser beam according to the power level of the laser beam on the recording medium 3 prevents deterioration of the recorded signals that results from continuous irradiation of a laser beam with a constant power level.

During reproduction, the LD driver 17 has a function F L The function F1 is to control the drive current (direct current) based on a power control command sent from the APC circuit 37. The function F1 is also to superimpose, on the drive current, an intermittent high-frequency current of the order of hundreds of megahertz with an amplitude; this amplitude is set thereby according to a superimposition control command indicative of a superimposed magnitude of current on the drive current sent from the computer 13. The function F1 is further to provide the intermittent high-frequency current to the LD unit 15 to thereby drive the LD unit 15. For example, the intermittent high-frequency current is in the form of a sine wave with its positive duty (on-duty) being less than 50%. The function F1 allows the LD unit 15 to output the high-frequency superimposed laser beam having the on-duty less than 50%.

In contrast, when it is determined that no intermittent high-frequency current is superimposed, the LD driver 17 provides the controlled drive current to the LD unit 15 to thereby drive it. This results in that the LD unit 15 outputs the laser beam with a controlled output power level.

Note that such operations of the LD driver 17 will be described in detail hereinafter.

Light reflected from a corresponding recorded signal based on the irradiated laser beam is detected through the receiver 30 as the RF signal by operations of the optical pickup unit 5.

The modulator and demodulator 45, during reproduction, has a function of:

amplifying the RF signal obtained by the receiver 30; and
producing a wobble-modulated signal, a tracking error signal indicative of an error caused by the tracking control, and a focusing error signal caused by the focusing control.

The modulator and demodulator 45 also has a function of demodulating (decoding) reproduction data (bit-string data) from the RF signal. The demodulated playback data is sent to the computer 13. The computer 13 carries out an error detecting task, a determining task to determine whether a detected error is allowed to be corrected, a correcting task to carry out error-correction when it is determined that the detected error is allowed to be corrected. The reproduction data after the correction task is stored in the buffer 43 by the computer 13.

The interface 41 works to, during reproduction, output the reproduction data stored in the buffer 43 to an information output device connected to the interface 41 under control of the information output device.

To the computer 13, an input unit 47 is connected. The input unit 47 is allowed to input, to the computer 13, various pieces of information and instructions including: setting information of a linear velocity of the recording medium 3, an executive instruction of an ECC-block defective determining and registering task, and an executive instruction of a test-writing. The linear velocity represents a velocity of a laser beam traveling on a medium during recording and/or reproducing, such as 1×, 2×, ..., 32×.

To the computer 13 and the servo driver 9, a DSP (Digital Signal Processor) 49 is connected. The DSP 49 is allowed to send, to the servo driver 9, a linear-velocity command. The linear-velocity command corresponds to the setting information of the linear-velocity set by the input unit 47 and passed to the computer 13.

Specifically, the servo driver 9 is operative to drive the spindle motor 25 according to the linear-velocity command from the DSP 49 to:

turn the recording medium 3 with the set linear velocity being kept constant (CLV: Constant Linear Velocity); or turn the recording medium 3 with an angular velocity being kept constant based on the set liner velocity (CAV: Constant Angular Velocity).

In addition, the servo driver 9 is operative to control the actuator 29 based on the tracking error signal and the focusing error signal obtained by the modulator and demodulator 45 to thereby carry out the focusing position control and the tracking control of the spot light to be irradiated on a recording track of the recording medium 3.

In the first embodiment, as the light control element 19, the liquid crystal device with the light transmittance that changes with change in control information applied from the computer 13 via the LC driver 38 is used, but the present invention is not limited to the structure.

For example, as a light control element according to the present invention, a variable light attenuator with a light attenuation quantity, in other words, a volume of light to be transmitted therethrough can be used; this light attenuation changes with change in a voltage applied from the computer 13 via a driver. As an example of the variable light attenuator, a variable ND (Neutral Density) filter or the like is used. A polarizer, such as a wavelength plate or a crystal liquid element, and an element designed by a beam splitter can be used as a light control element according to the present invention.

For example, the polarizer is disposed in place of the light control element 19 illustrated in FIG. 2, and the polarizer is used in combination with the beam splitter 21. The structure can constitute a light control element according to the present invention.

According to the structure, an optical axial direction (polarization direction) of the polarizer is changed according to control information applied from the computer 13 via a driver by a predetermined angle from a polarization direction of the incident laser beam. This allows the beam splitter 21 to split the laser beam transferred through the polarizer into a predetermined percent of the laser beam and the remaining percent thereof in light-volume. This can change the light transmittance of the incident laser beam transmitted through the polarizer and the beam splitter 21.

The computer 13 according to the first embodiment is configured to carry out a control task of the LD driver 17 and the light control element 19, a control task of the power adjusting unit 7, a control task of the servo driver 9, an error detecting and/or correcting task in accordance with programs P loaded to the second memory 13b.

Next, specific operations of the data recording/reproducing system 1 according to the first embodiment will be described with a particular emphasis on the control tasks of the power adjusting unit 7, the LD driver 17, and the light control element 19 by the computer 13.

In the data recoding/reproducing system 1 according to the first embodiment, when reproducing data recorded on the recording tracks of the recording medium 3, the computer 13 carries out the operations illustrated in FIG. 3 in accordance with at least one of the programs P loaded in the second memory 13b.

First, in step S1, the computer 13 carries out a recording-medium playback operation while the light transmittance of the light control element 19 is set to an initial percentage of 100%.

Note that 100% of the light transmittance of the light control element 19 means the light transmittance of the light control element 19 during no voltage being applied to the light control element 19.

Specifically, as the recording-medium playback operation, the computer 13 controls the spindle motor 25 through the DSP 49 and the servo driver 9 to thereby:

turn the recording medium 3 at the linear velocity inputted from the input unit 47 in, for example, the CLV mode;

set the power level of the laser beam irradiated on the recording medium 3 to a predetermined reproducing power level;

control the sample-hold circuit 35 based on the set reproducing power level during the execution of the APC; and send, to the LD driver 17, the superimposition control command indicative of a predetermined current level as the superimposed magnitude of current (referred to as a superimposed amplitude A1).

Based on the control during the execution of the APC in step S1, the sample-hold circuit 35 samples and holds a value of the monitor signal outputted from the amplifier 33 and measured by the monitor diode 31, and outputs the held value of the monitor signal, to the APC circuit 37.

At that time, the APC circuit 37 sends, to the LD driver 17, the power control command to substantially match a power level (monitored power level) corresponding to the sampled and held value of the monitor signal with the reproduction power level.

Based on the power control command sent from the APC circuit 37, the LD driver 17 controls the drive current (direct current), and superimpose, on the drive current, an intermittent high-frequency current Iout1 with the superimposed amplitude A1 corresponding to the superimposition control command indicative of the superimposed magnitude of current. The LD driver 17 provides the intermittent high-frequency current to the LD unit 15 to thereby drive the LD unit 15. For example, the intermittent high-frequency current Iout1 is in the form of a sine wave with its positive duty (on-duty) being less than 50%. This causes the LD unit 15 to output the high-frequency superimposed laser beam having the on-duty less than 50%.

As a result, the high-frequency superimposed laser beam is irradiated on the recorded signals written to a recording track of the recording medium 3 by operations of the optical pickup unit 5. The power of the laser beam irradiated on the recording medium 3 is substantially kept constant at the reproducing power level by the APC control.

Light reflected from a corresponding one of the recorded signals based on the irradiated laser beam is detected through the receiver 30 as the RF signal by operations of the optical pickup unit 5. The RF signal is decoded by the modulator and demodulator 45 as reproduction data (bit-string data) of the ECC blocks, and thereafter, the reproduction data is sent to the computer 13. After the error-correcting task has been applied to the reproduction data, the reproduction data is outputted to an information output device or the like via the buffer 43 and the interface 41.

In parallel with the operation in step S1, the computer 13 monitors the linear velocity of the recording medium 3 from the servo driver 9, and determines whether the monitored liner velocity is equal to or greater than a predetermined velocity in step S2.

The predetermined velocity is set to a velocity by which a time required to pass through a minimum run length is close to the period of the intermittent high-frequency current Iout1. The predetermined velocity will be referred to as "threshold velocity" hereinafter.

When a result of the determination in step S2 is NO, that is, the monitored linear velocity is less than the threshold velocity corresponding to the minimum run length, the computer 13 determines that a recorded signal does not pass through the scanning position of the laser beam during a laser-beam off period, terminating the operations.

Otherwise, when the result of the determination in step S2 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S3.

In step S3, the computer 13 controls the voltage applied to the light control element 19 via the LC driver 38 while executing the APC control (sampling-on control), that is, while maintaining constant the power of the laser beam irradiated on the recording medium 3 to thereby reduce the light transmittance of the light control element 19 to a preset value, such as 50%.

Note that 50% of the light transmittance of the light control element 19 means that the percentage of the monitored power level during control of the voltage being applied to the light control element 19 to the monitored power level during no voltage being applied thereto (100% of the light transmittance) becomes substantially 50%.

The reduction in the light transmittance of the light control element 19 and the APC control (the irradiated-power constant control) allow the output power of the laser beam outputted from the LD unit 15 to increase.

In parallel with the operation in step S3 or before and after the operation in step S3, the computer 13 sends, to the LD driver 17, a superimposition reducing command to change the superimposed amplitude A1 to a superimposed amplitude A2 lower than the superimposed amplitude A1 as the superimposition control command in step S4.

While controlling the drive current based on the power control command sent from the APC circuit 37, the LD driver 17 reduces the amplitude A1 of the intermittent high-frequency current Iout1 to the amplitude A2 corresponding to the superimposition reducing command. As a result, it is possible to continuously maintain the level of the high-frequency superimposed laser beam outputted from the LD unit 15 on (exceeding an off level) (see the superimposition magnitude setting function F1 in FIG. 1).

FIG. 4 is a view illustrating a relationship among:

the intermittent high-frequency current Iout1 to be superimposed on the drive current Id from the APC circuit 37 in steps S1 to S4;

the intermittent high-frequency current Iout2 to be superimposed on the drive current Id from the APC circuit 37 in steps S1 to 54;

a laser-beam output Po1 outputted from the LD unit 15 and corresponding to the intermittent high-frequency current Iout1; and a laser-beam output Po2 outputted from the LD unit 15 and corresponding to the intermittent high-frequency current Iout2. Note that reference character Ith in FIG. 4 represents a threshold level. The LD unit 15 is configured to start laser-beam output when the drive current to be given to the LD unit 15 exceeds the threshold level Ith.

Specifically, as a result of the determination in step S2, when the monitored liner velocity is less than the threshold velocity corresponding to the minimum run length (NO in step S2), the high-frequency current Iout1 with the amplitude A1 is continuously superimposed on the drive current from the APC circuit 37. For this reason, it is possible to set the output waveform of the laser beam Po outputted from the LD unit 15 to the output waveform Po1 that is intermittently turned on relative to the laser-beam off level, in other words, to change the laser beam Po to a multimode laser beam. This results in reducing external feedback noise during reproduction.

In contrast, as a result of the determination in step S2, when the monitored liner velocity is equal to or greater than the threshold velocity corresponding to the minimum run length (YES in step S2), as clearly understood by comparison between recorded signals and the laser-beam output waveform Po1, a recorded signal may pass through the scanning position of the laser beam in a laser-beam off period.

At that time, in the first embodiment, the amplitude A1 of the high-frequency current Iout1 is reduced to the amplitude A2 while the power of the laser beam irradiated on the recording medium 3 is substantially maintained at the reproduction power level, and the high-frequency current Iout2 with the amplitude A2 is superimposed on the drive current.

As a result, as illustrated in FIG. 4, it is possible to set the output waveform of the laser beam Po outputted from the LD unit 15 to the output waveform Po2; this output waveform Po2 has a constant level higher than the laser-beam off level, and its average value (average level) corresponding to the drive current from the APC circuit 37 is unchanged from that of the output waveform Po1 of the laser beam.

Accordingly, referring to FIG. 4, the recorded signals each pass through the scanning position of the laser beam during the laser-beam output being on at all times, making it possible to reliably read edges of each of the recorded signals, that is, edges of each of the recorded marks.

As described above, according to the first embodiment, even if the reproducing linear velocity of the recording medium 3 is so set to a desired velocity that a recorded signal may pass through the scanning position of the laser beam in a laser-beam off period, the reduction in the superimposed magnitude of the intermittent high-frequency current on the drive current of the LD unit 15 according to the change in the reproducing linear velocity can reliably read the recorded signals.

As a result, it is possible to provide the data recording/reproducing system 1 that, while improving the reproduction performance with increase in the reproducing linear velocity, reduces the effect of the external feedback noise due to the increase in the quantity of the outputted laser beam, prevents the increase in the power of the laser beam on the recording medium 3, and prevents the skip of a recorded signal.

Moreover, according to the first embodiment, the laser beam is intermittently turned on and off through the LD unit 15 while the power of the laser beam irradiated on the recording medium 3 is substantially maintained at a constant level. This makes it possible to prevent the recording layer of the recording medium 3 from being deteriorated.

According to the first embodiment, the reduction in the superimposed magnitude of the intermittent high-frequency current on the drive current of the LD unit 15 depending on the change in the reproducing liner velocity of the recording medium 3 reduces undesired radiation due to the high-frequency current.

Note that, in step S4 illustrated in FIG. 3, the computer 13 sends, to the LD driver 17, a superimposition reducing command to change the superimposed amplitude A1 of the intermittent high-frequency current Iout1 to a superimposed amplitude A2 lower than the superimposed amplitude A1 as the superimposition control command. The present invention is however not limited to the structure.

Specifically, in step S4 illustrated in FIG. 3, the computer 13 can send, to the LD driver 17, a superimposition reducing command to set the superimposed amplitude A1 of the intermittent high-frequency current Iout1 to zero as the superimposition control command, in other words, to cancel the superimposition of the intermittent high-frequency current on the drive current.

The LD driver 17 provides, to the LD unit 15, the drive current without being changed, in other words, without superimposing an intermittent high-frequency current on the drive current to thereby drive the LD unit 15.

As described above, according to the modification, even if the reproducing linear velocity is so set to a desired velocity that a recorded signal may pass through the scanning position of the laser beam in a laser-beam off period, setting of the superimposed magnitude of the intermittent high-frequency current to zero can reliably read the recorded signals.

As a result, as well as the first embodiment, it is possible to provide the data recording/reproducing system 1 that, while improving the reproduction performance with increase in the reproducing linear velocity, reduces the effect of the external feedback noise due to the increase in the quantity of the outputted laser beam, prevents the increase in the power of the laser beam on the recording medium 3, and prevents the skip of a recorded signal.

The modification also can prevent the recording layer of the recording medium 3 from being deteriorated.

Second Embodiment

A data recording/reproducing system according to a second embodiment of the present invention will be described hereinafter with reference to the corresponding drawings. Note that the hardware structural elements of the data recording/reproducing system according to the second embodiment is substantially identical to those of the data recording/reproducing system 1 according to the first embodiment. For this reason, like reference characters are assigned to the identical elements in the data recording/reproducing systems according to the first and second embodiments so that descriptions of the elements of the data recording/reproducing system of the second embodiment will be omitted or simplified.

In the data recoding/reproducing system according to the second embodiment, when reproducing data recorded on the recording tracks of the recording medium 3, the computer 13 carries out the operations illustrated in FIG. 5 in place of in FIG. 3 in accordance with at least one of the programs P loaded in the second memory 13b.

As well as the operations in steps S1 and S2, the computer 13 carries out: the operation to determine the initial percentage of the light transmittance of the light control element 19, the operation to playback the recording medium 3, and the operation to determine whether the liner velocity is equal to or greater than the threshold velocity (see steps S10 and S11 in FIG. 5).

By the recording-medium playback operation, the LD driver 17 controls the drive current, and superimposes, on the drive current, the intermittent high-frequency current Iout1 with the superimposed amplitude A1 corresponding to the superimposition control command.

By the recording-medium playback operation, the LD driver 17 provides the intermittent high-frequency current to the LD unit 15 to thereby drive the LD unit 15. This causes the LD unit 15 to output the multimode-modulated laser beam having the on-duty less than 50%.

The high-frequency superimposed laser beam is irradiated on the recorded signals written to a recording track of the recording medium 3 by operations of the optical pickup unit 5. The power of the laser beam irradiated on the recording medium 3 is substantially kept constant at the reproducing power level by the APC control.

Light reflected from a corresponding one of the recorded signals based on the irradiated laser beam is detected through the receiver 30 as the RF signal by operations of the optical pickup unit 5. The RF signal is decoded by the modulator and demodulator 45 as reproduction data (bit-string data) of the ECC blocks, and thereafter, the reproduction data is sent to the computer 13.

At that time, when a result of the determination in step S11 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S12.

In step S12, the computer 13 computes an error rate as a reproducing characteristic based on the reproduction data of an ECC block sent thereto. Moreover, in step S12, the computer 13 determines whether the computed error rate is equal to or greater than a predetermined threshold value that is a criterion of determination of whether the reproducing of the corresponding ECC block is difficult.

Note that the reproducing characteristic according to the second embodiment is an index for evaluating the reproduction data obtained by the record and reproduction data processing unit 11 and the computer 13. For example, in the second embodiment, the percentage of PI error representing the number of error bytes in all of the rows of each ECC block, which corresponds to the division of the number of error bytes by the number of normal bytes in each ECC block, is used as the reproducing characteristic.

When a result of the determination in step S12 is NO, that is, the error rate is less than the predetermined threshold value, the computer 13 determines that the corresponding ECC block can be reproduced, proceeding to step S15. As a result, the reproduction data of the corresponding ECC block is outputted to an information output device or the like via the buffer 43 and the interface 41.

When a result of the determination in step S12 is YES, that is, the error rate is equal to or greater than the predetermined threshold value, the computer 13 determines that the readout of a recorded signal by the laser beam is impossible due to the monitored linear velocity being equal to or greater than the threshold velocity so that the error rage is equal to or greater than the threshold value whereby the reproducing of the corresponding ECC block is difficult, proceeding to step S13.

In step S13, like the operation in step S3 of FIG. 3, the computer 13 controls the voltage applied to the light control element 19 via the LC driver 38 while executing the APC control (sampling-on control), that is, while maintaining constant the power of the laser beam irradiated on the recording medium 3 to thereby reduce the light transmittance of the light control element 19 to a preset value, such as 50%.

The reduction in the light transmittance of the light control element 19 and the APC control (the irradiated-power constant control) allow the output power of the laser beam outputted from the LD unit 15 to increase.

In parallel with the operation in step S13 or before and after the operation in step S13, the computer 13 sends, to the LD driver 17, a superimposition reducing command to change the superimposed amplitude A1 to the superimposed amplitude A2 lower than the superimposed amplitude A1 as the superimposition control command in step S14.

While controlling the drive current based on the power control command sent from the APC circuit 37, the LD driver 17 reduces the amplitude A1 of the intermittent high-frequency current Iout1 to the amplitude A2 corresponding to the superimposition reducing command. As a result, it is possible to continuously maintain the level of the high-frequency superimposed laser beam outputted from the LD unit 15 on (see FIG. 4).

After the completion of the operation in step S14 or when a result of the determination in step S12 is NO, that is, the corresponding ECC block can be reproduced, the computer 13 proceeds to step S15.

In step S15, the computer 13 computes the output power of the laser beam outputted from the LD unit 15 based on the monitor signal sent from the monitor diode 31 via the amplifier 33 and/or on the value of the drive current on which the intermittent high-frequency current is superimposed given to the LD unit 15 from the LD driver 17. Then, the computer 13 determines whether the computed output power reaches threshold power that has a predetermined percent margin to the rated power of the LD unit 15 in step S15.

When a result of the determination is NO, that is, the output power of the laser beam outputted from the LD unit 15 is less than the threshold power of the LD unit 15, the computer 13 returns to step S12.

At that time, the high-frequency superimposed laser beam outputted from the LD unit 15 with its level being on by the operation in step S14 is irradiated again on a plurality of recorded marks corresponding to the recorded signals written to a recording track of the recording medium 3. The power of the laser beam irradiated on the recording medium 3 is substantially kept constant at the reproducing power level by the APC control.

Light reflected from a corresponding one of the recorded signals based on the irradiated laser beam is detected again through the receiver 30 as the RF signal by operations of the optical pickup unit 5. The RF signal is decoded by the modulator and demodulator 45 as reproduction data (bit-string data) of the ECC blocks, and thereafter, the reproduction data is sent to the computer 13.

The computer 13 computes the error rate as the reproducing characteristic based on the reproduction data of an ECC block sent thereto, and determines whether the computed error rate is equal to or greater than the predetermined threshold value (see step S12).

Specifically, the computer 13 repeatedly carries out the operations in steps S12 to S15 until the determination in step S12 is NO (the error rate is less than the predetermined threshold value) or the determination in step S15 is YES (the output power of the laser beam reaches the threshold power).

The operations in steps S12 to S15 include: the comparison and determination operation for the error rate with respect to the threshold value, the light-transmittance reducing operation, the superimposition magnitude reducing operation via the LD driver 17, and the comparison and determination operation for the output power of the laser beam with respect to the threshold power.

When the determination in step S12 is NO (the error rate is less than the threshold value), it is determined that:

an increase in the output power of the laser beam, while the level of the multimode-modulated laser beam outputted from the LD unit 15 is continuously on and the power of the laser beam irradiated on the recording medium 3 is substantially kept constant, causes the error rate of the corresponding ECC block to be improved to a reproducible value.

This results in that the reproduction data of the corresponding ECC block is outputted to an information output device or the like via the buffer 43 and the interface 41.

When the determination in step S15 is NO after the determination in step S12 has been NO, the computer 13 returns to step S12, and repeatedly carries out the operations in steps S12 to S15 for a next ECC block to be reproduced.

In addition, when the determination in step S15 is YES, that is, the output power of the laser beam outputted from the LD unit 15 reaches the threshold power after completion of the operation in step S14, it is difficult to increase the output power of the laser beam outputted from the LD unit 15 by reducing the light transmittance of the light control element. For this reason, the computer 13 repeatedly carries out the operations in steps S12 to S15 (ECC-block regenerating process) while maintaining the light transmittance of the light control element 19 at an actual value in step S16.

As described above, according to the second embodiment, even if the reproducing linear velocity of the recording medium 3 is so set to a desired velocity that a recorded signal may pass through the scanning position of the laser beam in a laser-beam off period so that the error rate is equal to or greater than the predetermined threshold value representing the difficulty in reproducing, the reduction in the light transmittance of the light control element 19 with increasing output power of the laser beam allows the superimposed magnitude of the intermittent high-frequency current on the drive current of the LD unit 15 to be reduced according to the change in the reproducing linear velocity while maintaining the power of the laser beam irradiated on the recording medium 3 at a constant level.

The reduction in the superimposed magnitude of the intermittent high-frequency current on the drive current of the LD unit 15 allows the recorded signals to be reliably read. As a result, it is possible to provide the data recording/reproducing system 1 that, while improving the reproduction performance with increase in the reproducing linear velocity, reduces the effect of the external feedback noise due to the increase in the quantity of the outputted laser beam, prevents the increase in the power of the laser beam on the recording medium 3, and prevents the skip of a recorded signal.

Moreover, according to the second embodiment, the reduction in the superimposed magnitude of the intermittent high-frequency current on the drive current of the LD unit 15 is reduced depending on the change in the reproducing liner velocity of the recording medium 3 reduces undesired radiation due to the high-frequency current.

FIG. 6 is a graph (reference character G1) representing one example relationship between reproducing linear-velocity variation and error-rate variation obtained by reproducing data recorded on a Blu-ray Disc used as the recording medium 3 with the use of the operations in steps S10 to S16.

Note that, in the graph illustrated in FIG. 6, the horizontal axis represents multiple variations in the reproducing linear velocity (1 is 1×, 2 is 2×, . . . ), and the vertical axis represents the variations in the error rate.

In FIG. 6, reference character G2 represents one example relationship between reproducing linear-velocity variation and error-rate variation obtained by reproducing data recorded on a Blu-ray Disc used as the recording medium 3 with the use of the simple high-frequency superimposing method described in the Background Art. In FIG. 6, reference character G3 represents one example relationship between reproducing linear-velocity variation and error-rate variation obtained by reproducing data recorded on a Blu-ray Disc used as the recording medium 3 without using such high-frequency superimposing.

As apparent from FIG. 6, reproducing of data recorded on the Blu-ray Disc while the reproducing linear velocity is changed with the use of the operations in steps S10 to S16 permits the effective reduction in the increasing rate of the error rate with respect to the variations in the reproducing linear velocity as compared with the other reproducing methods.

Note that, in the second embodiment, as well as the modification of the first embodiment, in step S5 of FIG. 5, the computer 13 can send, to the LD driver 17, a superimposition reducing command to set the superimposed amplitude of the intermittent high-frequency current to zero as the superimposition control command. This can obtain the same effect as the modification of the first embodiment.

Third Embodiment

A data recording/reproducing system according to a third embodiment of the present invention will be described hereinafter with reference to the corresponding drawings. Note that the hardware structural elements of the data recording/reproducing system according to the third embodiment is substantially identical to those of the data recording/reproducing system 1 according to the first embodiment. For this reason, like reference characters are assigned to the identical elements in the data recording/reproducing systems according to the first and third embodiments so that descriptions of the elements of the data recording/reproducing system of the third embodiment will be omitted or simplified.

In the data recoding/reproducing system according to the third embodiment, when reproducing data recorded on the recording tracks of the recording medium 3, the computer 13 carries out the operations illustrated in FIG. 7 in place of in FIG. 3 in accordance with at least one of the programs P loaded in the second memory 13b.

First, while setting the light transmittance of the light control element 19 to a desired percentage, such as the initial percentage of 100%, the computer 13 carries out the operation to playback the recording medium described in step S1 of FIG. 3 in step S20. Next, the computer 13 carries out the operation to determine whether the liner velocity is equal to or greater than the threshold velocity described in step S2 of FIG. 3 in step S21.

When a result of the determination in step S21 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S22.

In step S22, the computer 13 sends, to the LD driver 17, a superimposition reducing command to change the superimposed amplitude A1 to the superimposed amplitude A2 lower than the superimposed amplitude A1 as the superimposition control command in step S22.

While controlling the drive current based on the power control command sent from the APC circuit 37, the LD driver 17 reduces the amplitude A1 of the intermittent high-frequency current Iout1 to the amplitude A2 corresponding to the superimposition reducing command. As a result, it is possible to continuously maintain the level of the high-frequency superimposed laser beam outputted from the LD unit 15 on (exceeding the off level) (see FIG. 4).

As described above, according to the third embodiment, even if the reproducing linear velocity of the recording medium 3 is so set to a desired velocity that a recorded signal may pass through the scanning position of the laser beam in a laser-beam off period, the reduction in the superimposed magnitude of the intermittent high-frequency current on the drive current of the LD unit 15 according to the change in the reproducing linear velocity allows the recorded signals to be reliably read.

As a result, it is possible to provide the data recording/reproducing system 1 that prevents the skip of a recorded signal while improving the reproduction performance with increase in the reproducing linear velocity, Note that, in the third embodiment, as well as the modification of the first embodiment, in step S23 of FIG. 7, the computer 13 can send, to the LD driver 17, a superimposition reducing command to set the superimposed amplitude A1 of the intermittent high-frequency current Iout1 to zero as the superimposition control command, in other words, to cancel the superimposition of the intermittent high-frequency current on the drive current. This can obtain the same effect as the modification of the first embodiment.

Fourth Embodiment

A data recording/reproducing system according to a fourth embodiment of the present invention will be described hereinafter with reference to the corresponding drawings. Note that the hardware structural elements of the data recording/reproducing system according to the fourth embodiment is substantially identical to those of the data recording/reproducing system 1 according to the first embodiment. For this reason, like reference characters are assigned to the identical elements in the data recording/reproducing systems according to the first and fourth embodiments so that descriptions of the elements of the data recording/reproducing system of the fourth embodiment will be omitted or simplified.

In the data recoding/reproducing system according to the fourth embodiment, when reproducing data recorded on the recording tracks of the recording medium 3, the computer 13 carries out the operations illustrated in FIG. 8 in place of in FIG. 3 in accordance with at least one of the programs P loaded in the second memory 13b. In the fourth embodiment, the operations illustrated in FIG. 8 are executed for each ECC block of the recorded data to be reproduced.

First, while setting the light transmittance of the light control element 19 to a desired percentage, such as the initial percentage of 100%, the computer 13 carries out the operation to playback the recording medium described in step S10 of FIG. 5 in step S30.

Next, the computer 13 carries out the operation to determine whether the liner velocity is equal to or greater than the threshold velocity described in step S11 of FIG. 5 in step S31.

When a result of the determination in step S31 is YES, that is, the monitored linear velocity is equal to or greater than the threshold velocity, the computer 13 proceeds to step S32. In step S32, the computer 13 carries out the error-rate determining operation with respect to the predetermined threshold value similar to that in step S12.

When a result of the determination in step S32 is YES, that is, the error rate is equal to or greater than the predetermined threshold value, the computer 13 determines that the playback of the corresponding ECC block is difficult, proceeding to step S33.

In step S33, the computer 13 carries out the operation to send the superimposition reducing command similar to that in step S14.

As set forth above, according to the forth embodiment, even if the reproducing linear velocity of the recording medium 3 is so set to a desired velocity that a recorded signal may pass through the scanning position of the laser beam in a laser-beam off period so that the error rate is equal to or greater than the predetermined threshold value representing the difficulty in reproducing, it is possible to reduce the superimposed magnitude of the intermittent high-frequency current on the drive current of the LD unit 15 according to the change in the reproducing linear velocity.

The reduction in the superimposed magnitude of the intermittent high-frequency current on the drive current of the LD unit 15 allows the recorded signals to be reliably read. As a result, it is possible to provide the data recording/reproducing system 1 that prevents the skip of a recorded signal while improving the reproduction performance with increase in the reproducing linear velocity.

Note that, in the fourth embodiment, as well as the modification of the first embodiment, in step S34 of FIG. 8, the computer 13 can send, to the LD driver 17, a superimposition reducing command to set the superimposed amplitude of the intermittent high-frequency current to zero as the superimposition control command. This can obtain the same effect as the modification of the first embodiment.

Fifth Embodiment

A data recording/reproducing system 1A according to a fifth embodiment of the present invention will be described hereinafter with reference to the corresponding drawings.

FIG. 9 is a block diagram illustrating a schematic structure of the data recording/reproducing system 1A according to the fifth embodiment of the present invention.

Referring to FIG. 9, an LD driver 17A of the data recording/reproducing system 1A has a function F2 in place of the function F1 described in the first to fourth embodiments. The function F2 is to set a superimposed frequency of the order of hundreds of megahertz according to a superimposition-frequency control command indicative of a superimposed frequency of current on the drive current sent from the computer 13. The function F2 is also to superimpose, on the drive current, an intermittent high-frequency current with the superimposed frequency on the controlled drive current. For example, the intermittent high-frequency current is in the form of a sine wave with its on-duty being less than 50%.

Note that the hardware structural elements except for the LD driver 17A are substantially identical to those of the data recording/reproducing system 1 according to the first embodiment. For this reason, like reference characters are assigned to the identical elements in the data recording/reproducing systems according to the first and fifth embodiments so that descriptions of the elements of the data recording/reproducing system of the fifth embodiment will be omitted or simplified.

In the data recoding/reproducing system according to the fifth embodiment, when reproducing data recorded on the recording tracks of the recording medium 3, the computer 13 carries out the operations illustrated in FIG. 10 in place of in FIG. 3 in accordance with at least one of the programs P loaded in the second memory 13b.

First, while setting the light transmittance of the light control element 19 to the initial percentage of 100% (maintaining the voltage non-applying state), the computer 13 carries out the recording-medium playback operation in step S40.

Specifically, as the recording-medium playback operation, the computer 13 controls the spindle motor 25 through the DSP 49 and the servo driver 9 to thereby:

turn the recording medium 3 at the linear velocity inputted from the input unit 47 in, for example, the CLV mode;

set the power level of the laser beam irradiated on the recording medium 3 to a predetermined reproducing power level;

control the sample-hold circuit 35 based on the set reproducing power level during the execution of the APC; and send, to the LD driver 17, the superimposition-frequency control command indicative of a predetermined frequency as the superimposed frequency of current (referred to as a superimposed frequency f1 of the order of hundreds of megahertz).

Based on the control during the execution of the APC in step S40, the sample-hold circuit 35 samples and holds a value of the monitor signal outputted from the amplifier 33 and measured by the monitor diode 31, and outputs the held value of the monitor signal to the APC circuit 37.

At that time, the APC circuit 37 sends, to the LD driver 17, the power control command to substantially match the monitored power level corresponding to the sampled and held value of the monitor signal with the reproduction power level.

Based on the power control command sent from the APC circuit 37, the LD driver 17 controls the drive current, and superimpose, on the drive current, an intermittent high-frequency current Iout10 with the superimposed frequency f1 corresponding to the superimposition-frequency control command indicative of the superimposed frequency of current. The LD driver 17 provides the intermittent high-frequency current Iout10 to the LD unit 15 to thereby drive the LD unit 15. For example, the intermittent high-frequency current Iout10 is in the form of a sine wave with its on-duty being less than 50%. This causes the LD unit 15 to output the high-frequency superimposed laser beam having the on-duty less than 50%.

As a result, the high-frequency superimposed laser beam is irradiated on the recorded signals written to a recording track of the recording medium 3 by operations of the optical pickup unit 5. The power of the laser beam irradiated on the recording medium 3 is substantially kept constant at the reproducing power level by the APC control.

Light reflected from a corresponding one of the recorded signals based on the irradiated laser beam is detected through the receiver 30 as the RF signal by operations of the optical pickup unit 5. The RF signal is decoded by the modulator and demodulator 45 as reproduction data (bit-string data) of the ECC blocks, and thereafter, the reproduction data is sent to the computer 13. After the error-correcting task has been applied to the reproduction data, the reproduction data is outputted to an information output device or the like via the buffer 43 and the interface 41.

In parallel with the operation in step S40, the computer 13 monitors the linear velocity of the recording medium 3 from the servo driver 9, and determines whether the monitored liner velocity is equal to or greater than the predetermined velocity in step S41.

When a result of the determination in step S41 is NO, that is, the monitored linear velocity is less than the threshold velocity, the computer 13 determines that a recorded signal does not pass through the scanning position of the laser beam during a laser-beam off period, terminating the operations.

Otherwise, when the result of the determination in step S41 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S42.

In step S42, the computer 13 sends, to the LD driver 17, a superimposition-frequency increasing command to change the superimposed frequency f1 to a superimposed frequency f2 higher than the superimposed frequency f1 as the superimposition-frequency control command.

While controlling the drive current based on the power control command sent from the APC circuit 37, the LD driver 17 increases the frequency f1 of the intermittent high-frequency current Iout10 to the frequency f2 corresponding to the superimposition-frequency increasing command. As a result, it is possible to continuously maintain the level of the high-frequency superimposed laser beam outputted from the LD unit 15 on (exceeding an off level) (see the superimposition frequency setting function F2 in FIG. 9).

FIG. 11 is a view illustrating a relationship among:

the intermittent high-frequency current Iout10 to be superimposed on the drive current Id from the APC circuit 37 in steps S40 to S42;

an intermittent high-frequency current Iout11 to be superimposed on the drive current Id from the APC circuit 37 in steps S40 to S42;

a laser-beam output Po10 outputted from the LD unit 15 and corresponding to the intermittent high-frequency current Iout10; and a laser-beam output Po11 outputted from the LD unit 15 and corresponding to the intermittent high-frequency current Iout11.

Specifically, as a result of the determination in step S41, when the monitored liner velocity is less than the threshold velocity corresponding to the minimum run length (NO in step S41), the high-frequency current Iout10 with the frequency f1 is continuously superimposed on the drive current from the APC circuit 37. For this reason, referring to FIG. 11, it is possible to set the output waveform of the laser beam Po outputted from the LD unit 15 to a multimode waveform that is synchronize with the high-frequency current Iout10 as the output waveform Po10. This results in reducing external feedback noise during reproduction.

In contrast, as a result of the determination in step S41, when the monitored liner velocity is equal to or greater than the threshold velocity corresponding to the minimum run length (YES in step S41), as clearly understood by comparison between recorded signals and the laser-beam output waveform Po10, a recorded signal may pass through the scanning position of the laser beam in a laser-beam off period.

At that time, in the fifth embodiment, the frequency f1 of the high-frequency current Iout10 is increased to the frequency f2 while the power of the laser beam irradiated on the recording medium 3 is substantially maintained at the reproduction power level, and the high-frequency current Iout11 with the frequency f2 is superimposed on the drive current.

In the fifth embodiment, the superimposed frequency f2 is set such that a period corresponding to the superimposed frequency f2 is shorter than the time length corresponding to the minimum run length of the recorded signals.

As a result, as illustrated in FIG. 11, it is possible to set the output waveform of the laser beam Po outputted from the LD unit 15 to the output waveform Po11 having the period shorter than the time length required to pass through the minimum run length of the recorded signals at the threshold velocity.

Accordingly, referring to FIG. 11, the recorded signals each pass through the scanning position of the laser beam during the laser-beam output being on at all times, making it possible to reliably read the recorded signals.

As described above, according to the fifth embodiment, even if the reproducing linear velocity of the recording medium 3 is so set to a desired velocity that a recorded signal may pass through the scanning position of the laser beam in a laser-beam off period, the increase in the superimposed frequency of the intermittent high-frequency current on the drive current of the LD unit 15 according to the change in the reproducing linear velocity can reliably read the recorded signals.

As a result, it is possible to provide the data recording/reproducing system 1A that, while improving the reproduction performance with increase in the reproducing linear velocity, prevents the skip of a recorded signal.

Sixth Embodiment

A data recording/reproducing system according to a sixth embodiment of the present invention will be described hereinafter with reference to the corresponding drawings. Note that the hardware structural elements of the data recording/reproducing system according to the sixth embodiment is substantially identical to those of the data recording/reproducing system 1A according to the fifth embodiment. For this reason, like reference characters are assigned to the identical elements in the data recording/reproducing systems according to the fifth and sixth embodiments so that descriptions of the elements of the data recording/reproducing system of the sixth embodiment will be omitted or simplified.

In the data recoding/reproducing system according to the sixth embodiment, when reproducing data recorded on the recording tracks of the recording medium 3, the computer 13 carries out the operations illustrated in FIG. 12 in place of in FIG. 10 in accordance with at least one of the programs P loaded in the second memory 13b. In the sixth embodiment, the operations illustrated in FIG. 12 are executed for each ECC block of the recorded data to be reproduced.

As well as the operations in steps S40 and S41, the computer 13 carries out: the operation to determine the initial percentage of the light transmittance of the light control element 19, the operation to playback the recording medium 3, and the operation to determine whether the liner velocity is equal to or greater than the threshold velocity (see steps S50 and S51 in FIG. 12).

By the recording-medium playback operation, the LD driver 17A controls the drive current, and superimposes, on the drive current, the intermittent high-frequency current Iout10 with the superimposed frequency f1 corresponding to the superimposition-frequency control command. The LD driver 17A provides the intermittent high-frequency current Iout10 to the LD unit 15 to thereby drive the LD unit 15. This causes the LD unit 15 to output the multimode-modulated laser beam having the on-duty less than 50%.

The high-frequency superimposed laser beam is irradiated on the recorded signals written to a recording track of the recording medium 3 by operations of the optical pickup unit 5. The power of the laser beam irradiated on the recording medium 3 is substantially kept constant at the reproducing power level by the APC control.

Light reflected from a corresponding one of the recorded signals based on the irradiated laser beam is detected through the receiver 30 as the RF signal by operations of the optical pickup unit 5. The RF signal is decoded by the modulator and demodulator 45 as reproduction data of the ECC blocks, and thereafter, the reproduction data is sent to the computer 13.

At that time, when a result of the determination in step S51 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of edges of a recorded signal by the laser beam may be impossible, proceeding to step S52.

In step S52, the computer 13 computes the error rate as the reproducing characteristic based on the reproduction data of an ECC block sent thereto. Moreover, in step S52, the computer 13 determines whether the computed error rate is equal to or greater than the predetermined threshold value.

When a result of the determination in step S52 is YES, that is, the error rate is equal to or greater than the predetermined threshold value, the computer 13 determines that the reproducing of the corresponding ECC block is difficult, proceeding to step S53.

In step S53, the computer 13 sends, to the LD driver 17, a superimposition-frequency increasing command to change the superimposed frequency f1 to the superimposed frequency f2 lower than the superimposed frequency f1 as the superimposition-frequency control command.

While controlling the drive current based on the power control command sent from the APC circuit 37, the LD driver 17A increases the frequency f1 of the intermittent high-frequency current Iout10 to the frequency f2 corresponding to the superimposition-frequency increasing command. As a result, it is possible to continuously maintain the level of the high-frequency superimposed laser beam outputted from the LD unit 15 on (see FIG. 11).

As described above, according to the sixth embodiment, even if the reproducing linear velocity of the recording medium 3 is so set to a desired velocity that a recorded signal may pass through the scanning position of the laser beam in a laser-beam off period so that the error rate is equal to or greater than the predetermined threshold value representing the difficulty in reproducing, it is possible to increase the superimposed frequency of the intermittent high-frequency current on the drive current of the LD unit 15 according to the change in the reproducing linear velocity.

The increase in the superimposed frequency of the intermittent high-frequency current on the drive current of the LD unit 15 allows the recorded signals to be reliably read. As a result, it is possible to provide the data recording/reproducing system 1A that, while improving the reproduction performance with increase in the reproducing linear velocity, prevents the skip of a recorded signal as in the fifth embodiment.

FIG. 13 is a graph (reference character G11) representing one example relationship between reproducing linear-velocity variation and error-rate variation obtained by reproducing data recorded on a Blu-ray Disc used as the recording medium 3 with the use of the operations in steps S50 to S53.

Note that, in the graph illustrated in FIG. 13, the horizontal axis represents multiple variations in the reproducing linear velocity (1 is 1×, 2 is 2×, . . . ), and the vertical axis represents the variations in the error rate.

In FIG. 13, reference character G12 represents one example relationship between reproducing linear-velocity variation and error-rate variation obtained by reproducing data recorded on a Blu-ray Disc used as the recording medium 3 with the use of the simple high-frequency superimposing method described in the Background Art.

As apparent from FIG. 13, reproducing of data recorded on the Blu-ray Disc while the reproducing linear velocity is changed with the use of the operations in steps S50 to S53 permits the effective reduction in the increasing rate of the error rate with respect to the variations in the reproducing linear velocity as compared with the other reproducing method.

Seventh Embodiment

A data recording/reproducing system according to a seventh embodiment of the present invention will be described hereinafter with reference to the corresponding drawings. Note that the hardware structural elements of the data recording/reproducing system according to the seventh embodiment is substantially identical to those of the data recording/reproducing system 1A according to the fifth embodiment. For this reason, like reference characters are assigned to the identical elements in the data recording/reproducing systems according to the fifth and seventh embodiments so that descriptions of the elements of the data recording/reproducing system of the seventh embodiment will be omitted or simplified.

In the data recoding/reproducing system according to the seventh embodiment, when reproducing data recorded on the recording tracks of the recording medium 3, the computer 13 carries out the operations illustrated in FIG. 14 in place of in FIG. 10 in accordance with at least one of the programs P loaded in the second memory 13b.

Referring to FIG. 14, the computer 10 carries out operations identical to those in steps S40 and S41.

Specifically, while setting the light transmittance of the light control element 19 to the initial percentage of 100% (maintaining the voltage non-applying state), the computer 13 carries out the recording-medium playback operation in step S40, and the liner-velocity determining operation in step S41.

When the result of the determination in step S41 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S60.

In step S60, as well as the operation in step S3 of FIG. 3, the computer 13 controls the voltage applied to the light control element 19 via the LC driver 38 while executing the APC control, that is, while maintaining constant the power of the laser beam irradiated on the recording medium 3 to thereby reduce the light transmittance of the light control element 19 to a preset value, such as 50%. The reduction in the light transmittance of the light control element 19 and the APC control (the irradiated-power constant control) allow the output power of the laser beam outputted from the LD unit 15 to increase.

In parallel with the operation in step S60 or before and after the operation in step S60, the computer 13 sends, to the LD driver 17A, a superimposition-frequency increasing command to change the superimposed frequency f1 to the superimposed frequency f2 as the superimposition control command in step S42.

While controlling the drive current based on the power control command sent from the APC circuit 37, the LD driver 17A increases the frequency f1 of the intermittent high-frequency current Iout10 to the frequency f2 corresponding to the superimposition-frequency increasing command. As a result, it is possible to continuously maintain the level of the high-frequency superimposed laser beam outputted from the LD unit 15 on (see FIG. 11).

As described above, according to the seventh embodiment, even if the reproducing linear velocity of the recording medium 3 is so set to a desired velocity that a recorded signal may pass through the scanning position of the laser beam in a laser-beam off period, the increase in the superimposed frequency of the intermittent high-frequency current on the drive current of the LD unit 15 according to the change in the reproducing linear velocity can reliably read the recorded signals.

As a result, it is possible to provide the data recording/reproducing system 1A that, while improving the reproduction performance with increase in the reproducing linear velocity, reduces the effect of the external feedback noise and prevents the skip of a recorded signal.

In addition, according to the seventh embodiment, it is possible to intermittently turn the laser beam on and off via the LD unit 15 while the power of the laser beam irradiated on the recording medium 3 is substantially kept constant, thus preventing the protective layer of the recording medium 3 from being deteriorated.

Eighth Embodiment

A data recording/reproducing system according to an eighth embodiment of the present invention will be described hereinafter with reference to the corresponding drawings. Note that the hardware structural elements of the data recording/reproducing system according to the eighth embodiment is substantially identical to those of the data recording/reproducing system 1A according to the fifth embodiment. For this reason, like reference characters are assigned to the identical elements in the data recording/reproducing systems according to the fifth and eighth embodiments so that descriptions of the elements of the data recording/reproducing system of the eighth embodiment will be omitted or simplified.

In the data recoding/reproducing system according to the eighth embodiment, when reproducing data recorded on the recording tracks of the recording medium 3, the computer 13 carries out the operations illustrated in FIG. 15 in place of in FIG. 10 in accordance with at least one of the programs P loaded in the second memory 13b. In the eighth embodiment, the operations illustrated in FIG. 15 are executed for each ECC block of the recorded data to be reproduced.

Referring to FIG. 15, the computer 10 carries out operations identical to those in steps S50 and S51 of FIG. 12.

Specifically, while setting the light transmittance of the light control element 19 to the initial percentage of 100%, the computer 13 carries out the recording-medium playback operation in step S50, and the liner-velocity determining operation in step S51.

When a result of the determination in step S51 is YES, that is, the monitored linear velocity is equal to or greater than the threshold velocity, the computer 13 determines that the readout of a recorded signal by the laser beam may be impossible, proceeding to step S52. In step S52, the computer 13 computes the error rate as the reproducing characteristic based on the reproduction data of an ECC block sent thereto. Moreover, in step S52, the computer 13 determines whether the computed error rate is equal to or greater than the predetermined threshold value.

When a result of the determination in step S52 is YES, that is, the error rate is equal to or greater than the predetermined threshold value, the computer 13 determines that the reproducing of the corresponding ECC block is difficult, proceeding to step S60.

In step S60, as well as the operation in step S3 of FIG. 3, the computer 13 controls the voltage applied to the light control element 19 via the LC driver 38 while executing the APC control, that is, while maintaining constant the power of the laser beam irradiated on the recording medium 3 to thereby reduce the light transmittance of the light control element 19 to a preset value, such as 50%. The reduction in the light transmittance of the light control element 19 and the APC control (the irradiated-power constant control) allow the output power of the laser beam outputted from the LD unit 15 to increase.

In parallel with the operation in step S60 or before and after the operation in step S60, the computer 13 sends, to the LD driver 17A, a superimposition-frequency increasing command to change the superimposed frequency f1 to the superimposed frequency f2 as the superimposition control command in step S53.

While controlling the drive current based on the power control command sent from the APC circuit 37, the LD driver 17A increases the frequency f1 of the intermittent high-frequency current Iout10 to the frequency f2 corresponding to the superimposition-frequency increasing command. As a result, it is possible to continuously maintain the level of the high-frequency superimposed laser beam outputted from the LD unit 15 on (see FIG. 11).

As described above, according to the eighth embodiment, even if the reproducing linear velocity of the recording medium 3 is so set to a desired velocity that a recorded signal may pass through the scanning position of the laser beam in a laser-beam off period so that the error rate is equal to or greater than the predetermined threshold value representing the difficulty in reproducing, the reduction in the light transmittance of the light control element 19 with increasing output power of the laser beam allows the superimposed frequency of the intermittent high-frequency current on the drive current of the LD unit 15 to be increased according to the change in the reproducing linear velocity while maintaining the power of the laser beam irradiated on the recording medium 3 at a constant level.

The increase in the superimposed frequency of the intermittent high-frequency current on the drive current of the LD unit 15 allows the recorded signals to be reliably read. As a result, it is possible to provide the data recording/reproducing system 1A that, while improving the reproduction performance with increase in the reproducing linear velocity, reduces the effect of the external feedback noise due to the increase in the quantity of the outputted laser beam, prevents the increase in the power of the laser beam on the recording medium 3, and prevents the skip of a recorded signal.

Moreover, according to the eighth embodiment, the power of the outputted laser beam is increased only when the error rate of the data (an ECC block) to be reproduced is equal to or greater than the predetermined threshold value. For this reason, it is possible to reduce the increase in temperature and/or the increase in current consumption due to the outputted laser beam.

In the fifth to eight embodiments, according to the superimposition-frequency increasing command, the LD driver 17A increases the superimposed frequency of the intermittent high-frequency current to be superimposed on the drive current of the LD unit 15, but the present invention is not limited to the structure.

For example, in the fifth embodiment, the computer 13 has stored in the first memory 13a data representing a frequency characteristic of current-attenuation associated with current transfer between the LD driver 17A and the LD unit 15. For example, the current-attenuation frequency characteristic is a current-attenuation frequency characteristic of wiring between the LD driver 17A and the LD unit 15.

At that moment, as step S42A corresponding to step S42, referring to FIG. 16, based on the superimposed frequency increase from the frequency f1 to the frequency f2, the computer 13 obtains a current attenuation during current transfer from the LD driver 17A to the LD unit 15 from the current-attenuation frequency characteristic data stored in the memory 13a. Then, the computer 13, as step S42B, sends, to the LD driver 17A, a correction command indicative of a correction current to cancel the obtained current attenuation in addition to the superimposition-frequency increasing command.

While controlling the drive current based on the power control command sent from the APC circuit 37, the LD driver 17A increases the frequency f1 of the intermittent high-frequency current Iout10 to the frequency f2 corresponding to the superimposition-frequency increasing command. In addition, the LD driver 17A increases the amplitude of the intermittent high-frequency current Iout10 by the correction current contained in the correction command.

As a result, it is possible to continuously maintain the level of the high-frequency superimposed laser beam outputted from the LD unit 15 on, and to correct the attenuation of the intermittent high-frequency current being transferred from the LD driver 17A to the LD unit 15.

In the operations identical to the operation in step S42 according to the other embodiments, the operations in steps S42A and S42B can be carried out.

Note that, in the first to eighth embodiments, as the reproducing characteristic that is an index for evaluating the reproduction data obtained by the record and reproduction data processing unit 11 and the computer 13, the PI error rate for each ECC block is used, but the present invention is not limited to the structure.

Specifically, various pieces of data that are responsible for reproducing-data evaluating index, such as jitter representing the rate of variation between the reproduction data and a clock extracted from the reproduction data, can be used as the reproducing characteristic.

In the first to eighth embodiments, the control task for the light control element 19 in the optical pickup unit 5, the control task for the power adjusting unit 7, the control task for the servo driver 9, and the process associated with the error-detecting and/or error-correcting tasks are configured to be carried out by the computer 13 in accordance with the corresponding programs P. The present invention is however not limited to the structure.

Specifically, these tasks can be shared by two or more computers.

In the first to eighth embodiments, the superimposition magnitude setting function F1 and the superimposition-frequency setting function F2 can be carried out, as the superimposition magnitude setting process and the superimposition-frequency setting process, by a computer circuit, such as a microcomputer, installed in the LD driver in accordance with programs externally loaded from, for example, a computer or the like.

In the first to eighth embodiments, when the monitored linear velocity is less than the threshold velocity corresponding to the minimum mark length, the computer 13 determines that the recorded signals can be read by the laser beam, but the present invention is not limited to the structure.

For example, during the CAV reproduction, the computer 13 can continuously monitor the actual reproducing liner velocity via the serve driver 9. This configuration allows, even if the reproducing linear velocity increases toward the outer periphery of the recording medium 3 during the CAV reproduction up to a threshold velocity, such as 3 T, and over, the computer 13 to detect the increase in the reproducing linear velocity equal to or greater the threshold velocity to thereby carry out:

both the light-transmittance reducing task and the superimposition magnitude reducing task;

the magnitude reducing task;

both the light-transmittance reducing task and the superimposition-frequency increasing task; or superimposition-frequency increasing task.

This prevents the skip of a recorded signal.

In the aforementioned embodiments, the monitor diode is arranged on the optical path of the backside laser beam outputted from the back surface opposing the normal output end in the package of the LD unit 15. The monitor diode is configured to monitor the backside laser beam. The present invention is not however limited to the arrangement. For example, the monitor diode can be configured to continuously monitor the power of part of the laser beam passing through the beam splitter 21 and the stand-up mirror 23 illustrated in FIG. 2. The monitor diode can be arranged on an optical path between the light control element 19 and the objective lens 27, or on an optical path branched from an optical system between the light control element 19 and the objective lens 27, and configured to monitor reflected light on the corresponding optical path.

The present invention is not limited to the aforementioned embodiments and their modifications, and can be implemented as variations of the aforementioned embodiments and their modifications within the scope of the present invention.

The invention claimed is:

1. An optical recording/reproducing system for reading a recorded signal written to a recording track of a recording medium by light, the light being modulated by a drive signal on which a frequency signal is superimposed, the light being scanned along the recording track at a predetermined scan velocity, the optical recording/reproducing system comprising:

a superimposed frequency control unit that controls, based on the scan velocity, a superimposed frequency of the frequency signal on the drive signal, wherein, when the scan velocity is equal to or greater than a threshold velocity set based on a minimum run length of the recorded signal and a modulation period of the output light, the superimposed frequency control unit includes a superimposed frequency increasing unit that increases the superimposed frequency of the frequency signal.

2. The optical recording/reproducing system according to claim 1, further comprising:

a light source that outputs the light scanned by the predetermined scan velocity;

a light-quantity adjusting unit allowed to adjust a quantity of the output light from the light source under external control;

a power monitor unit that monitors power of the output light scanned on the recording medium; and a light-quantity control unit that controls, through the light-quantity adjusting unit, the quantity of the output light based on the monitored power by the power monitor unit.

3. The optical recording/reproducing system according to claim 2, further comprising a first determining unit that determines whether the scan velocity is equal to or greater than a threshold velocity set based on a minimum run length of the recorded signal and a modulation period of the output light, wherein, when it is determined that the scan velocity is equal to or greater than the threshold velocity by the first determining unit, the light-quantity control unit variably controls the quantity of the output light via the light-quantity adjusting unit while substantially maintaining constant the monitored power by the power monitor unit.

4. The optical recording/reproducing system according to claim 1, further comprising a second determining unit that determines whether a value of data indicative of a reproducing characteristic of data reproduced based on the recorded signal is equal to or greater than a threshold value associated with difficulty in reproducing, wherein, when it is determined that value of the data indicative of the reproducing characteristic is equal to or greater than the threshold value associated with difficulty in reproducing by the second determining unit, the superimposed frequency control unit includes a superimposed frequency increasing unit that increases the superimposed frequency of the frequency signal.

5. The optical recording/reproducing system according to claim 3, further comprising a second determining unit that determines whether a value of data indicative of a reproducing characteristic of data reproduced based on the recorded signal is equal to or greater than a threshold value associated with difficulty in reproducing, wherein, when it is determined that the scan velocity is equal to or greater than the threshold velocity by the first determining unit, and when it is determined that value of the data indicative of the reproducing characteristic is equal to or greater than the threshold value associated with difficulty in reproducing by the second determining unit, the light-quantity control unit includes a light-quantity changing unit that changes the quantity of the output light via the light-quantity adjusting unit while substantially maintaining constant the monitored power by the power monitor unit.

6. The optical recording/reproducing system according to claim 4 wherein the data indicative of the reproducing characteristic of the data reproduced based on the recorded signal includes at least one of an error rate and jitter, the error rate representing a percentage of error in the reproduced data, the jitter representing a rate of variation between the reproduced data and a clock extracted from the reproduced data.

7. The optical recording/reproducing system according to claim 2, further comprising:

a first determining unit that determines whether the scan velocity is equal to or greater than a threshold velocity set based on a minimum run length of the recorded signal and a modulation period of the output light; and a second determining unit that determines whether a value of data indicative of a reproducing characteristic of data reproduced based on the recorded signal is equal to or greater than a threshold value associated with difficulty in reproducing when it is determined that the scan velocity is equal to or greater than the threshold velocity by the first determining unit, wherein, when it is determined that value of the data indicative of the reproducing characteristic is equal to or greater than the threshold value associated with difficulty in reproducing by the second determining unit, the light-quantity control unit includes a light-quantity changing unit that changes the quantity of the output light via the light-quantity adjusting unit while substantially maintaining constant the monitored power by the power monitor unit, and the superimposed frequency control unit includes a superimposed frequency increasing unit that increases the superimposed magnitude of the frequency signal.

8. The optical recording/reproducing system according to claim 1, further comprising a superimposed magnitude control unit that controls a superimposed magnitude of the frequency signal on the drive signal based on a controlled variable of the superimposed frequency of the frequency signal by the superimposed frequency control unit.

9. The optical recording/reproducing system according to claim 8, wherein the superimposed magnitude control unit:

includes an attenuation frequency characteristic during the frequency signal being transferred;

obtains, from the attenuation frequency characteristic, an attenuation of the frequency signal corresponding to the controlled variable of the superimposed frequency by the superimposed frequency control unit; and superimposes, on the drive signal, the frequency signal having a correction superimposed magnitude as the superimposed magnitude, the correction superimposed magnitude correcting the obtained attenuation.

10. The optical recording/reproducing system according to claim 2, wherein the light-quantity adjusting unit includes a light transmission element with a light transmittance as a degree of adjustment of the light quantity, the light transmittance being changeable under the external control so as to allow the quantity of the output light to be adjusted.

11. The optical recording/reproducing system according to claim 2, wherein the output light has a predetermined polarization direction, and the light-quantity adjusting unit includes:

a polarizer allowed to change the polarization direction by a predetermined angle under the external control; and a beam splitter that splits the output light transferred through the polarizer into a predetermined percent of the output light and the remaining percent thereof in light-quantity.

12. A non-transitory computer-readable storage medium storing program instructions readable by a computer installed in an optical recording/reproducing system that reads a recorded signal written to a recording track of a recording medium by light, the light being modulated by a drive signal on which a frequency signal is superimposed, the light being scanned along the recording track at a predetermined scan velocity, characterized in that the program instructions, upon executions by the computer, performs the method, the method comprising: executing an operation to control, based on the scan velocity, a superimposed frequency of the frequency signal on the drive signal, wherein, when the scan velocity is equal to or greater than a threshold velocity set based on a minimum run length of the recorded signal and a modulation period of the output light, the operation increases the superimposed frequency of the frequency signal.

13. An optical recording/reproducing method for reading a recorded signal written to a recording track of a recording medium by light, the light being modulated by a drive signal on which a frequency signal is superimposed, the light being scanned along the recording track at a predetermined scan velocity, the optical recording/reproducing method characterized by comprising:

controlling, based on the scan velocity, a superimposed frequency of the frequency signal on the drive signal, wherein, when the scan velocity is equal to or greater than a threshold velocity set based on a minimum run length of the recorded signal and a modulation period of the output light, the controlling increases the superimposed frequency of the frequency signal.

* * * * *